United States Patent
Ishii et al.

(10) Patent No.: US 8,477,745 B2
(45) Date of Patent: Jul. 2, 2013

(54) MOBLIE STATION FOR TRANSMITTING AN UPLINK SHARED SIGNAL AND BASE STATION APPARATUS FOR RECEIVING THE UPLINK SHARED SIGNAL

(75) Inventors: Hiroyuki Ishii, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 174 days.

(21) Appl. No.: 12/922,478

(22) PCT Filed: Mar. 19, 2009

(86) PCT No.: PCT/JP2009/055495
§ 371 (c)(1),
(2), (4) Date: Nov. 16, 2010

(87) PCT Pub. No.: WO2009/116642
PCT Pub. Date: Sep. 24, 2009

(65) Prior Publication Data
US 2011/0053625 A1    Mar. 3, 2011

(30) Foreign Application Priority Data
Mar. 21, 2008   (JP) ................................. 2008-074742

(51) Int. Cl.
*H04J 3/00*   (2006.01)

(52) U.S. Cl.
USPC ........ 370/336; 370/458; 370/498; 455/452.1; 709/226

(58) Field of Classification Search
None
See application file for complete search history.

(56) References Cited

U.S. PATENT DOCUMENTS

| 7,936,731 B2* | 5/2011 | Park et al. ..................... 370/336 |
| 2007/0097914 A1 | 5/2007 | Grilli et al. |
| 2009/0149187 A1 | 6/2009 | Miki et al. |
| 2009/0168731 A1* | 7/2009 | Zhang et al. .................. 370/336 |
| 2010/0290420 A1* | 11/2010 | Dalsgaard et al. ............ 370/329 |

FOREIGN PATENT DOCUMENTS

| JP | 11-341555 A | 12/1999 |
| JP | 2000-307513 A | 11/2000 |
| WO | 2006/109439 A1 | 10/2006 |
| WO | 2007117906 A1 | 10/2007 |

OTHER PUBLICATIONS

Extended European Search Report issued in corresponding European Patent Application No. 09 722 458.8; Dated Feb. 17, 2011 (10 pages).

(Continued)

*Primary Examiner* — Yemane Mesfin
*Assistant Examiner* — Khoa Huynh
(74) *Attorney, Agent, or Firm* — Osha Liang LLP

(57) ABSTRACT

A mobile station (100) according to the present invention includes: a transmitter unit (110) configured to transmit an uplink shared signal at a first time interval based on a received first downlink control signal; and a retransmitter unit (110) configured to retransmit the uplink shared signal at a second time interval based on a second downlink control signal received at a third time interval allocated fixedly. When the third time interval overlaps a time interval for measurement by the mobile station (100), the transmitter unit (110) is configured to transmit the uplink shared signal at the first time interval and the retransmitter unit (110) is configured not to retransmit the uplink shared signal at the second time interval.

2 Claims, 24 Drawing Sheets

OTHER PUBLICATIONS

RAN3: "RAN3 corrections to 36.300", 3GPP Draft; 36300_CR0011_(REL-8)_R2-081387, 3rd Generation Partnership Project (3GPP), Mobile Competence Centre; 650, Route des Lucioles; F-06921 Sophia-Antipolis Cedex; France, vol. RAN WG2, no. Sorrento, Italy; 20080222, Feb. 22, 2008, XP050138480, [retrieved on Feb. 2, 2008] (118 pages).

International Search Report w/translation from PCT/JP2009/055495 dated May 26, 2009 (4 pages).

Written Opinion from PCT/JP2009/055495 dated May 26, 2009 (4 pages).

3GPP TS 36.321 V8.1.0.; "3rd Generation Partnership Project; Technical Specification Group Radio Access Network; Evolved Universal Terrestrial Radio Access (E-UTRA) Medium Access Control (MAC) protocol specification"; Mar. 2008; 30 pages.

3GPP TS 36.211 V8.1.0; "3rd Generation Partnership Project; Technical Specification Group Radio Access Network; Evolved Universal Terrestrial Radio Access (E-UTRA); Physical Channels and Modulation"; Nov. 2007; 54 pages.

3GPP TS 36.300 V8.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description"; Dec. 2007; 121 pages.

Japanese Office Action mailed May 26, 2009; Reference No. 2007P00749; Japanese Patent Application Serial No. 2008-074742 with English translation (5 pages).

Canadian Office Action for Canadian Application No. 2,715,185, mailed Mar. 13, 2013 (5 pages).

* cited by examiner

PRIOR ART

MOBLIE STATION FOR TRANSMITTING AN UPLINK SHARED SIGNAL AND BASE STATION APPARATUS FOR RECEIVING THE UPLINK SHARED SIGNAL

TECHNICAL FIELD

The present invention relates to a mobile station configured to transmit an uplink shared signal at a first time interval instructed by a base station apparatus and to retransmit the uplink shared signal at a second time interval allocated fixedly, and a base station apparatus configured to receive an uplink shared signal from a mobile station.

More specifically, the present invention relates to a mobile station and a base station apparatus employing the LTE (Long Term Evolution) scheme.

BACKGROUND ART

A communication scheme succeeding the WCDMA scheme and the HSDPA scheme, namely, the LTE scheme is discussed by a standardization group 3GPP for the WCDMA scheme.

As radio access schemes for the LTE scheme, the OFDMA (Orthogonal Frequency Division Multiplexing Access) and the SC-FDMA (Single-Carrier Frequency Division Multiple Access) are used for downlink and uplink, respectively.

The OFDMA is a scheme where a certain frequency band is divided into narrower frequency bands (subcarriers) and these frequency bands carry data for transmission. According to the OFDMA, it is possible to achieve faster transmission and improve frequency utilization efficiency by arranging the subcarriers in the frequency band so densely that the subcarriers can partially overlap one another, without having mutual interference of the subcarriers.

Meanwhile, the SC-FDMA is a transmission scheme where a certain frequency band is divided and thus different frequency bands are used for transmission among a plurality of mobile stations, so that interference among the plurality of mobile stations can be reduced. According to the SC-FDMA, it is possible to achieve low power consumption and wide coverage for the mobile stations, since the SC-FDMA is characterized in that transmission power varies to a lesser extent.

The LTE scheme is a mobile communication system configured to perform communication while sharing one or more physical channels among the plurality of mobile stations for both of the uplink and the downlink. The channels shared by the plurality of mobile stations are generally referred to as shared channels.

In the LTE scheme, a shared channel (a physical channel) of the uplink is referred to as a "physical uplink shared channel (PUSCH)", and a shared channel (a physical channel) of the downlink is referred to as a "physical downlink shared channel (PDSCH)".

Meanwhile, a shared channel (a transport channel) of the uplink is referred to as an "uplink shared channel (UL-SCH)", and a shared channel (a transport channel) of the downlink is referred to as a "downlink shared channel (DL-SCH)".

Moreover, in the mobile communication system utilizing the above-described shared channels, it is necessary to perform signaling for each sub-frame (1 ms in the LTE scheme) to determine to which mobile station the above-described shared channels should be allocated.

In general, the above-mentioned sub-frame may also be referred to as a "TTI (transmission time interval)".

In the LTE scheme, a control channel used for such signaling is referred to as a "physical downlink control channel (PDCCH)".

Note that the above-mentioned PDCCH may also be referred to as a "downlink L1/L2 control channel (DL-L1/L2 control channel)" or as "downlink control information (DCI)".

For example, information transmitted on the physical downlink control channel includes "downlink scheduling information", an "uplink scheduling grant", a "transmission power control command bit", and the like.

Meanwhile, a HARQ indicator (ACK (acknowledgement)/NACK (negative acknowledgement)) concerning an uplink shared signal is transmitted on the downlink via a HARQ indicator channel.

As a physical channel, such a HARQ indicator channel is a "physical hybrid ARQ indicator channel (PHICH)".

The downlink scheduling information and the uplink scheduling grant described above correspond to the information for signaling to determine to which mobile station the above-described shared channels should be allocated.

For example, the above-described downlink scheduling information includes "allocation information of a downlink resource block", an "ID of a mobile station UE", the "number of streams", "information on a precoding vector", a "data size", a "modulation scheme", "information on HARQ (hybrid automatic repeat request)", and the like concerning the downlink shared channel.

Note that the above-mentioned downlink scheduling information may also be referred to as "downlink scheduling grant" or as "downlink assignment information".

For example, the above-mentioned uplink scheduling grant includes "allocation information of an uplink resource", an "ID of a mobile station UE", a "data size", a "modulation scheme", "uplink transmission power information", "information on a demodulation reference signal of uplink MIMO", and the like concerning the uplink shared channel.

Incidentally, the uplink of the LTE scheme applies synchronous hybrid automatic repeat request (synchronous HARQ) as a scheme of HARQ.

That is to say, as shown in FIG. 1, the uplink shared signal is retransmitted at a predetermined timing starting from a timing of initial transmission, or more specifically, on a predetermined cycle through the uplink shared channel.

In FIG. 1, the uplink shared signal is retransmitted on a cycle of every eight sub-frames. Here, the uplink shared signal may be retransmitted on a cycle other than every eight sub-frames.

Meanwhile, retransmission of the uplink shared signal is instructed from a base station apparatus to the mobile station by using the HARQ indicator or the uplink scheduling grant.

When retransmission of the uplink shared signal is instructed by way of the HARQ indicator, the mobile station retransmits the uplink shared signal by using the resource block and the modulation scheme which are the same as those used in a previous transmission.

On the other hand, when retransmission of the uplink shared signal is instructed by way of the uplink scheduling grant, the mobile station retransmits the uplink shared signal by using the resource block and the modulation scheme which are specified by the uplink scheduling grant.

The HARQ control on the uplink in the LTE scheme will be described in more detail by use of FIG. 2. FIG. 2 shows an example of HARQ processing on the uplink.

As shown in FIG. 2, at reference numeral 202 (a sub-frame #i) (where i is an integer satisfying i>0), the base station apparatus uses the uplink scheduling grant on the physical downlink control channel and instructs the mobile station to perform communication using the uplink shared channel at a sub-frame #i+4.

At reference numeral 204 (the sub-frame #i+4), the mobile station transmits the uplink shared signal to the base station apparatus, and the base station apparatus receives the uplink shared signal and attempts decoding thereof.

At reference numeral 206 (a sub-frame #i+8), the base station apparatus transmits either the HARQ indicator or the uplink scheduling grant based on a decoding result.

To be more precise, the base station apparatus transmits a HARQ indicator (ACK), when the decoding result of the uplink shared signal is OK.

Alternatively, the base station apparatus may newly transmit the uplink scheduling grant instructing transmission of the uplink shared signal, when data that are supposed to be newly transmitted exist in a transmission buffer of the mobile station.

On the other hand, when the decoding result of the uplink shared signal is NG, the base station apparatus either transmits a HARQ indicator (NACK) or transmits uplink scheduling grant instructing retransmission of the uplink shared signal.

At reference numeral 206 (the sub-frame #i+8), when NACK is transmitted via the HARQ indicator channel or the uplink scheduling grant instructing retransmission of the uplink shared signal is transmitted, the mobile station retransmits the uplink shared signal at a sub-frame #i+12 (reference numeral 208).

Here, at reference numeral 206 (the sub-frame #i+8), when ACK is transmitted via the HARQ indicator channel or when the uplink scheduling grant instructing transmission of a new uplink shared signal is transmitted, the uplink shared signal transmitted at reference numeral 204 is not retransmitted at the sub-frame #i+12.

Meanwhile, generally in the mobile communication system, a handover (HO) for changing the base station apparatuses to communicate with is executed, when the mobile station moves from a cell currently performing communication to an adjacent cell.

Moreover, prior to the handover, the mobile station measures communication quality in the adjacent cell being a candidate for a handover destination and reports a measurement result to the base station.

For example, such communication quality is assumed to include a reception level of a reference signal, a received SINR, and the like.

The report of the measurement to the base station apparatus is made in the form of a "measurement report".

Based on the measurement report, the base station apparatus determines that the mobile station should perform the handover, and a message instructing the handover is sent to the mobile station as a "handover command".

Here, the cell of the handover destination may be not only a cell at the same frequency in the same system, but also any of a cell at a different frequency in the same system and a cell using a different radio access technology (RAT).

The frequency of the cell using the different radio access technology is generally a different frequency from that of a handover source. Accordingly, the frequency of the cell at the handover destination is inevitably different from the frequency of the cell of the handover source.

FIG. 3 schematically shows how the handover is performed between the cells of the different frequencies. FIG. 3 shows a mobile communication system employing the LTE scheme including a mobile communication system using a first frequency f1 and a mobile communication system using a second frequency f2, and a mobile communication system employing the WCDMA scheme using a third frequency f3 which is different from the frequencies f1 and f2.

Incidentally, the mobile station generally includes only one radio signal processor unit and is therefore unable to perform transmission and reception of signals having different frequencies at the same time. For this reason, it is necessary to tune a reception frequency again when performing measurement in a cell using a different frequency (a different frequency cell) from a frequency of an active cell (a serving cell).

Accordingly, the base station apparatus notifies the mobile station of a gap period for the measurement, and thus the mobile station performs the measurement in the different frequency cell within the gap period.

To be more precise, the base station apparatus notifies the mobile station of a "length of the gap period", a "cycle of coming of the gap period", the "frequency of the different frequency cell", and the like, in accordance with RRC measurement control, and the mobile station performs the measurement in the different frequency cell (including processing to change the frequency, to catch the synchronization channel, to measure quality and so forth) within the specified gap period, for example.

The above-mentioned gap period may also be referred to as a gap term, for example. FIG. 4 shows an image diagram of such a gap term. In FIG. 4, a gap term having a length of "6 ms" is set up on a 40-ms cycle.

It should be noted that "different frequency measurement" in this specification is a concept which includes not only actions to search a cell of a different frequency and to measure communication quality in the cell but also actions to search a cell of a different RAT and to measure communication quality in the cell.

As described previously, the mobile station performs the different frequency measurement in the gap period. As a consequence, the mobile station cannot perform communication with the base station apparatus in the active cell (the serving cell) within the above-described gap period.

In the following, the HARQ control on the uplink in the case of presence of the above-described gap period will be described by using FIG. 5.

In FIG. 5, the gap period is defined from a sub-frame #i+1 to a sub-frame #i+6. That is, a sub-frame (#i+4) for transmitting the uplink shared signal is included in the gap period.

In this case, even when the base station apparatus instructs the mobile station at reference numeral 502 (a sub-frame #i) by way of the uplink scheduling grant on the physical downlink control channel to perform communication by using the uplink shared channel at the sub-frame #i+4, the mobile station cannot perform transmission of the uplink shared signal at reference numeral 504.

That is, the mobile station skips transmission of the uplink shared signal at reference numeral 504. In this case, the mobile station is suggested to perform retransmission of the uplink shared signal at reference numeral 508.

Here, transmission of the uplink shared signal at reference numeral 508 is virtually a first transmission but is also a second transmission, in terms of the number of times of HARQ transmission.

However, the HARQ control method on the uplink when the above-described gap period is present involves the following problems.

First, as shown in FIG. 6, the control method when the above-described gap period includes a sub-frame (reference numeral 606) for transmitting either the HARQ indicator concerning the uplink shared signal or the uplink scheduling grant for instructing retransmission although the gap period does not include a sub-frame (reference numeral 604) for transmitting the uplink shared signal is yet to be clarified.

Second, as shown in FIG. 7, the control method when the above-described gap period includes both of the sub-frame (reference numeral 604) for transmitting the uplink shared signal and the sub-frame (reference numeral 606) for transmitting either the HARQ indicator concerning the uplink shared signal or the uplink scheduling grant for instructing retransmission is yet to be clarified.

DISCLOSURE OF THE INVENTION

The present invention is therefore made in view of the foregoing problems and an object thereof is to provide a mobile station and a base station apparatus which are capable of realizing efficient and robust HARQ control concerning a HARQ control method on an uplink in the case where a gap period is present.

A first aspect of the present invention is summarized as a mobile station configured to transmit an uplink shared signal at a first time interval instructed by a base station apparatus and to retransmit the uplink shared signal at a second time interval allocated fixedly, including: a first receiver unit configured to receive a first downlink control signal instructing the first time interval; a transmitter unit configured to transmit the uplink shared signal at the first time interval based on the first downlink control signal; a second receiver unit configured to receive a second downlink control signal at a third time interval allocated fixedly; and a retransmitter unit configured to retransmit the uplink shared signal at the second time interval based on the second downlink control signal; wherein when the third time interval overlaps a time interval for measurement by the mobile station, the transmitter unit is configured to transmit the uplink shared signal at the first time interval and the retransmitter unit is configured not to retransmit the uplink shared signal at the second time interval.

A second aspect of the present invention is summarized as a mobile station configured to transmit an uplink shared signal at a first time interval instructed by a base station apparatus and to retransmit the uplink shared signal at a second time interval allocated fixedly, including: a first receiver unit configured to receive a first downlink control signal instructing the first time interval; a transmitter unit configured to transmit the uplink shared signal at the first time interval based on the first downlink control signal; a second receiver unit configured to receive a second downlink control signal at a third time interval allocated fixedly; and a retransmitter unit configured to retransmit the uplink shared signal at the second time interval based on the second downlink control signal; wherein when the third time interval overlaps a time interval for measurement by the mobile station, the transmitter unit is configured not to transmit the uplink shared signal at the first time interval and the retransmitter unit is configured to retransmit the uplink shared signal at the second time interval irrespective of whether or not the second downlink control signal is received.

A third aspect of the present invention is summarized as a mobile station configured to transmit an uplink shared signal at a first time interval instructed by a base station apparatus and to retransmit the uplink shared signal at a second time interval allocated fixedly, including: a first receiver unit configured to receive a first downlink control signal instructing the first time interval; a transmitter unit configured to transmit the uplink shared signal at the first time interval based on the first downlink control signal; a second receiver unit configured to receive a second downlink control signal at a third time interval allocated fixedly; and a retransmitter unit configured to retransmit the uplink shared signal at the second time interval based on the second downlink control signal; wherein when the third time interval overlaps a time interval for measurement by the mobile station, the transmitter unit is configured not to transmit the uplink shared signal at the first time interval and the retransmitter unit is configured not to retransmit the uplink shared signal at the second time interval.

A fourth aspect of the present invention is summarized as a mobile station configured to transmit an uplink shared signal at a first time interval instructed by a base station apparatus and to retransmit the uplink shared signal at a second time interval allocated fixedly, including: a first receiver unit configured to receive a first downlink control signal instructing the first time interval; a transmitter unit configured to transmit the uplink shared signal at the first time interval based on the first downlink control signal; a second receiver unit configured to receive a second downlink control signal at a third time interval allocated fixedly; and a retransmitter unit configured to retransmit the uplink shared signal at the second time interval based on the second downlink control signal; wherein when the first time interval overlaps a time interval for measurement by the mobile station, the retransmitter unit is configured not to transmit the uplink shared signal at the second time interval.

In the first, third and fourth aspects of the present invention, the retransmitter unit can be configured to retransmit the uplink shared signal at a time interval instructed by a third downlink control signal, when receiving the third downlink control signal.

Here, the third downlink control signal can be uplink scheduling grant instructing retransmission.

In the first to fourth aspects of the present invention, the first downlink control signal can be uplink scheduling grant; and the second downlink control signal can be any of uplink scheduling grant instructing retransmission and a HARQ indicator.

In the first to fourth aspects of the present invention, the time interval for measurement can be a time interval for measuring received quality at any of an adjacent cell of an identical frequency, an adjacent cell of a different frequency, and an adjacent cell in a different system.

A fifth aspect of the present invention is summarized as a base station apparatus configured to receive an uplink shared signal from a mobile station, including: a first transmitter unit configured to transmit a first downlink control signal to the mobile station, the first downlink control signal instructing a first time interval for transmitting an uplink shared signal; a first receiver unit configured to receive the uplink shared signal transmitted by the mobile station at the first time interval based on the first downlink control signal; a second transmitter unit configured to transmit a second downlink control signal at a third time interval allocated fixedly based on a reception result at the first receiver; and a second receiver unit configured to receive the uplink shared signal at the second time interval, the uplink shared signal being retransmitted by the mobile station based on the second downlink control signal; wherein when the third time interval overlaps a time interval for measurement by the mobile station, the first receiver unit is configured to receive the uplink shared signal at the first time interval, the second transmitter unit is configured not to transmit the second downlink control signal at the third time interval, and the second receiver unit is configured not to receive the uplink shared signal at the second time interval.

In the fifth aspect of the present invention, when the first receiver unit fails to receive the uplink shared signal at the first time interval, the second transmitter unit can be configured to transmit a third downlink control signal at a time interval not overlapping the time interval for measurement by the mobile station, and the second receiver unit can be configured to receive the uplink shared signal retransmitted by the mobile station based on the third downlink control signal at the time interval instructed by the third downlink control signal.

A sixth aspect of the present invention is summarized as a base station apparatus configured to receive an uplink shared signal from a mobile station, including: a first transmitter unit configured to transmit a first downlink control signal to the mobile station, the first downlink control signal instructing a first time interval for transmitting an uplink shared signal; a first receiver unit configured to receive the uplink shared signal transmitted by the mobile station at the first time interval based on the first downlink control signal; a second transmitter unit configured to transmit a second downlink control signal at a third time interval allocated fixedly based on a reception result at the first receiver; and a second receiver unit configured to receive the uplink shared signal at the second time interval, the uplink shared signal being retransmitted by the mobile station based on the second downlink control signal; wherein when the first time interval overlaps a time interval for measurement by the mobile station, the first receiver unit is configured not to receive the uplink shared signal at the first time interval, the second transmitter unit is configured not to transmit the second downlink control signal at the third time interval, and the second receiver unit is configured not to receive the uplink shared signal at the second time interval.

A seventh aspect of the present invention is summarized as a mobile station configured to transmit an uplink shared signal at a first time interval instructed by a base station apparatus and to retransmit the uplink shared signal at a second time interval allocated fixedly, including: a first receiver unit configured to receive a first downlink control signal instructing the first time interval; a transmitter unit configured to transmit the uplink shared signal at the first time interval based on the first downlink control signal; a second receiver unit configured to receive a second downlink control signal at a third time interval allocated fixedly; and a retransmitter unit configured to retransmit the uplink shared signal at the second time interval based on the second downlink control signal, wherein when the third time interval overlaps a time interval for measurement by the mobile station, the second receiver unit is configured to presume that an acknowledgement response is received as information on the second downlink control signal.

A eighth aspect of the present invention is summarized as a base station apparatus configured to receive an uplink shared signal from a mobile station, including: a first transmitter unit configured to transmit a first downlink control signal to the mobile station, the first downlink control signal instructing a first time interval for transmitting an uplink shared signal; a first receiver unit configured to receive the uplink shared signal transmitted by the mobile station based on the first downlink control signal at the first time interval; a second transmitter unit configured to transmit a second downlink control signal at a third time interval allocated fixedly based on a reception result at the first receiver; and a second receiver unit configured to receive the uplink shared signal at the second time interval, the uplink shared signal being retransmitted by the mobile station based on the second downlink control signal; wherein when the third time interval overlaps a time interval for measurement by the mobile station, the second transmitter unit is configured to presume that an acknowledgement response is transmitted as information on the second downlink control signal.

BEST MODES FOR CARRYING OUT THE INVENTION

Figure 1:
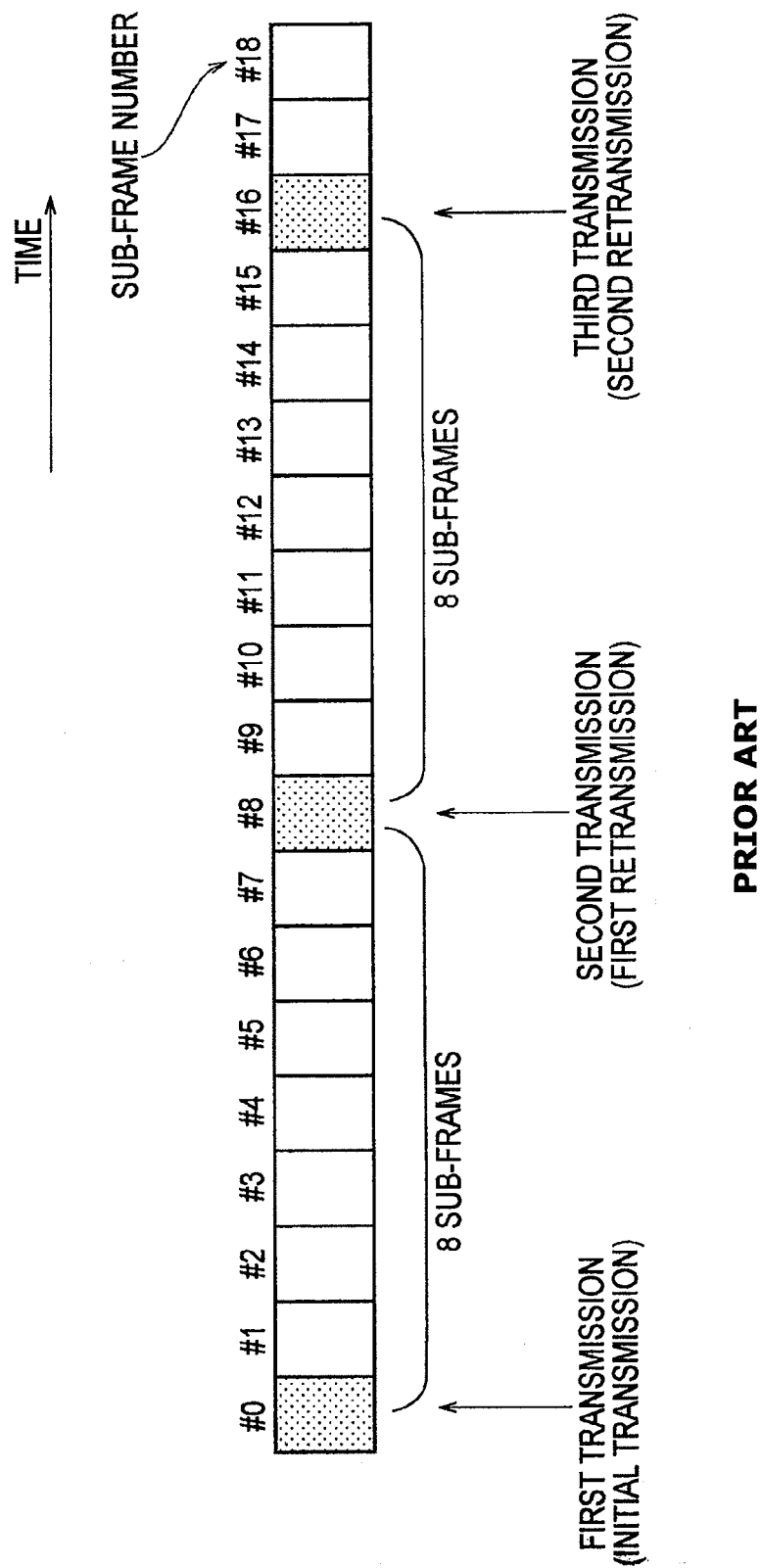
FIG. 1 is a view showing how an uplink shared channel signal is retransmitted in a mobile communication system employing a LTE scheme.
Figure 2:
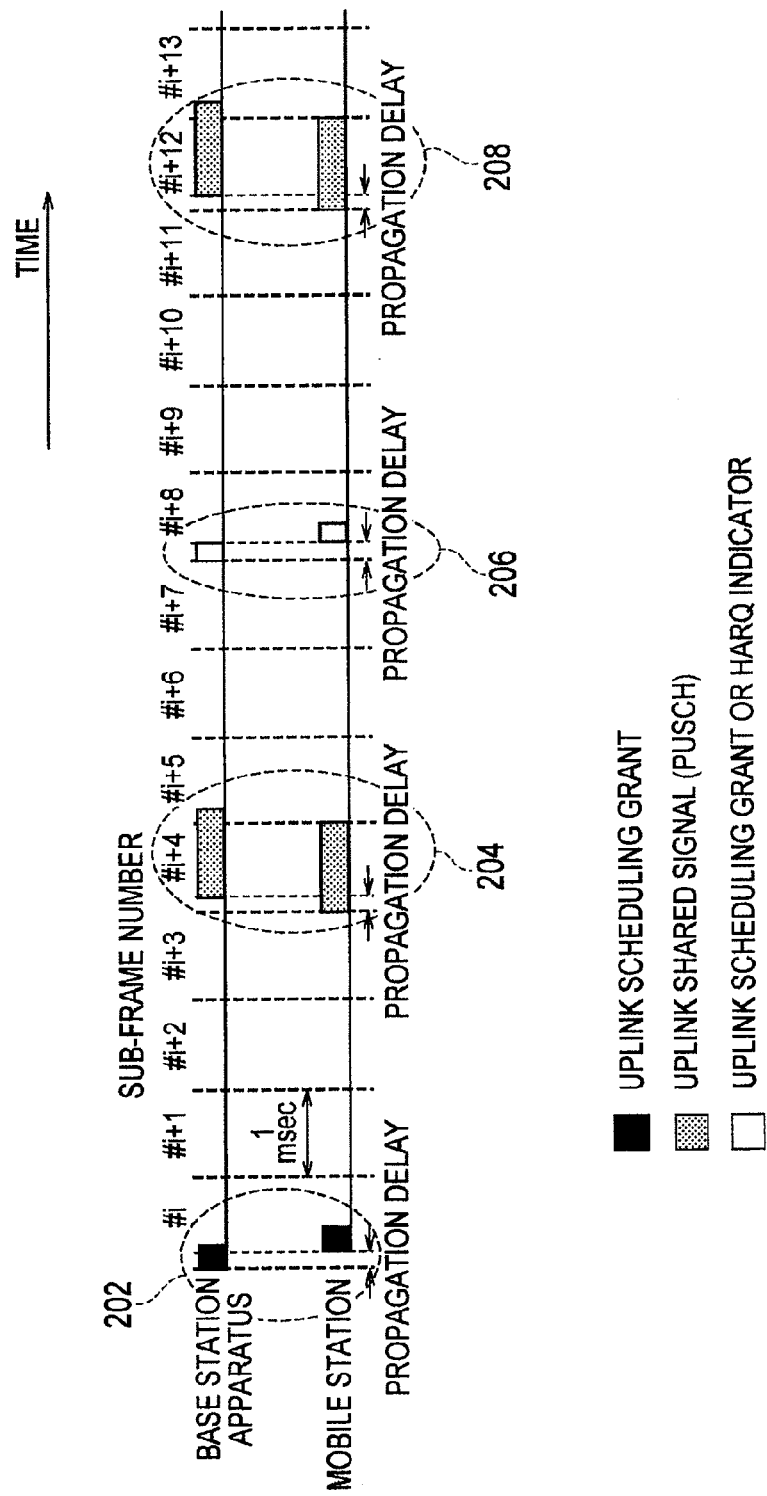
FIG. 2 is a view for explaining HARQ retransmission control in the mobile communication system employing the LTE scheme.
Figure 3:
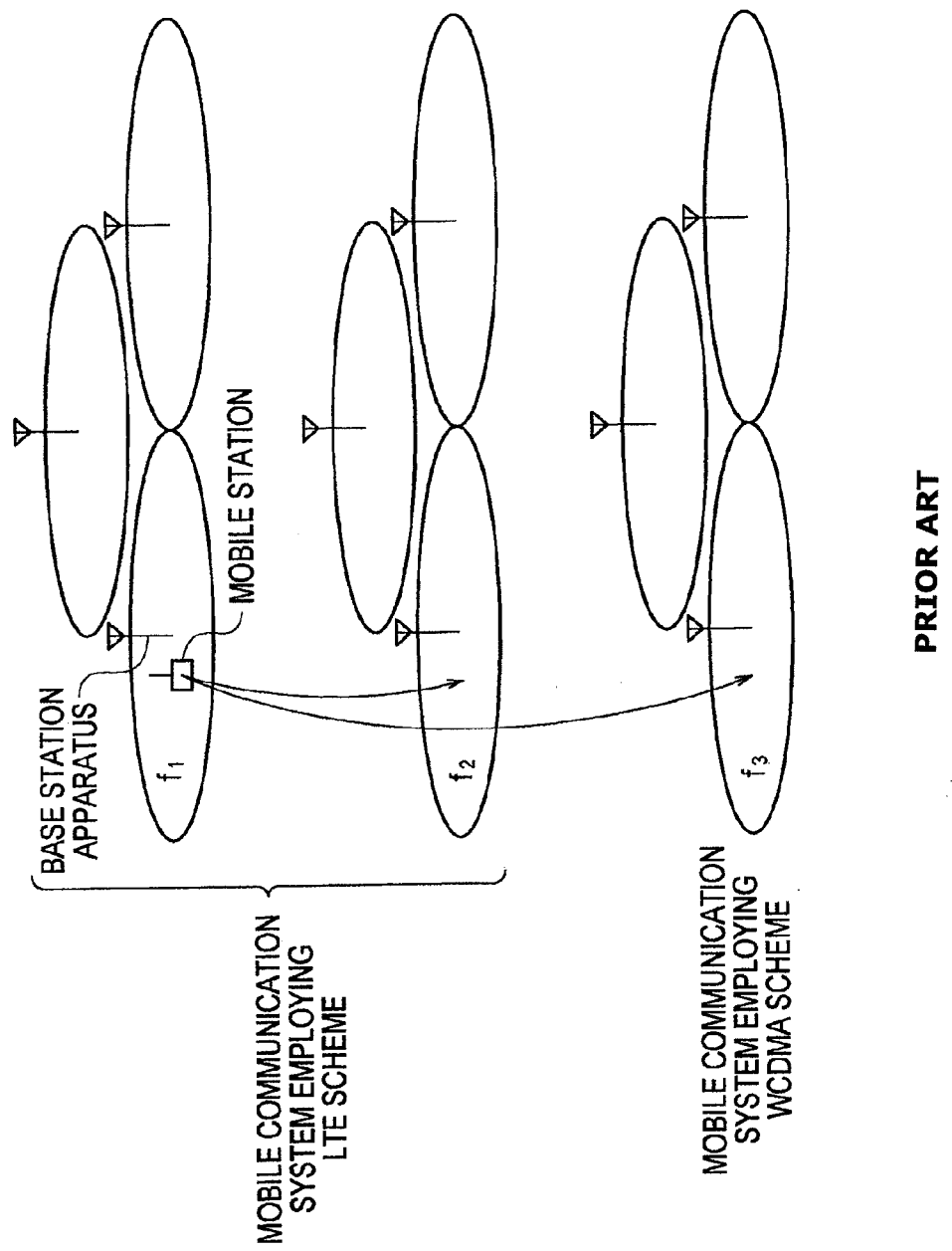
FIG. 3 is a view for explaining handover control between different frequency cells.
Figure 4:
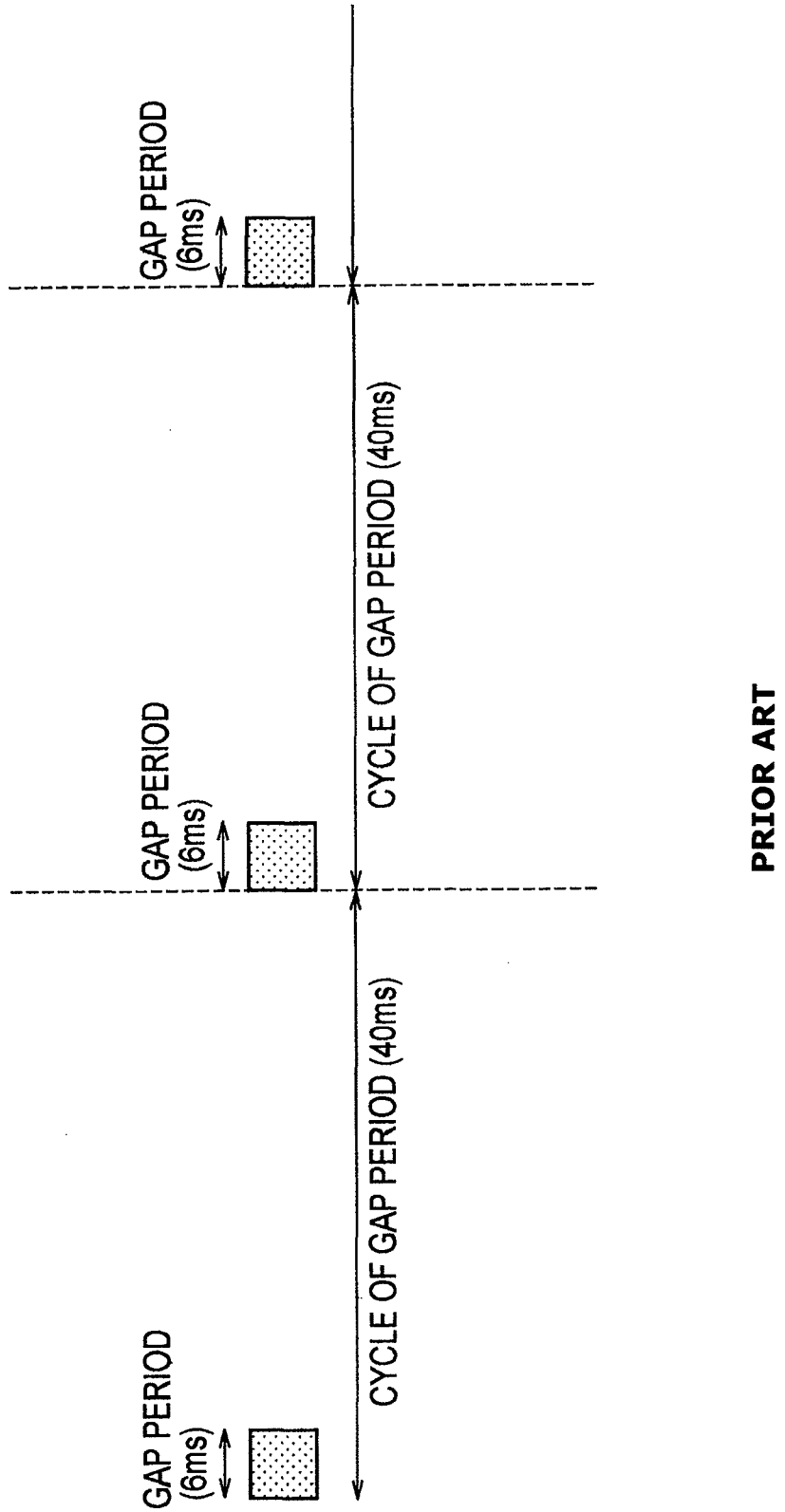
FIG. 4 is a view for explaining a gap period in the handover control between different frequency cells.
Figure 5:
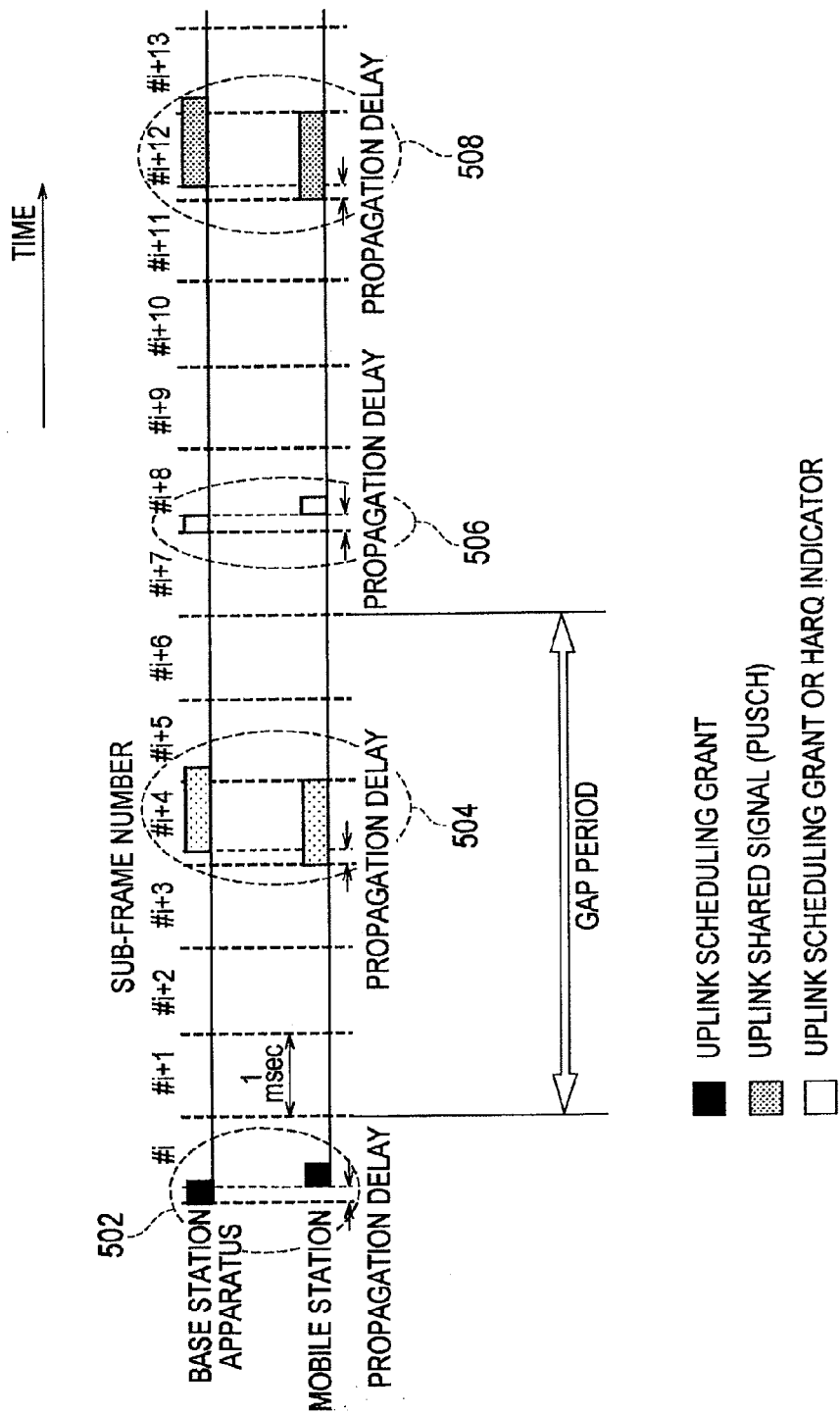
FIG. 5 is a view for explaining HARQ retransmission control in a mobile communication system in which the gap period is present.
Figure 6:
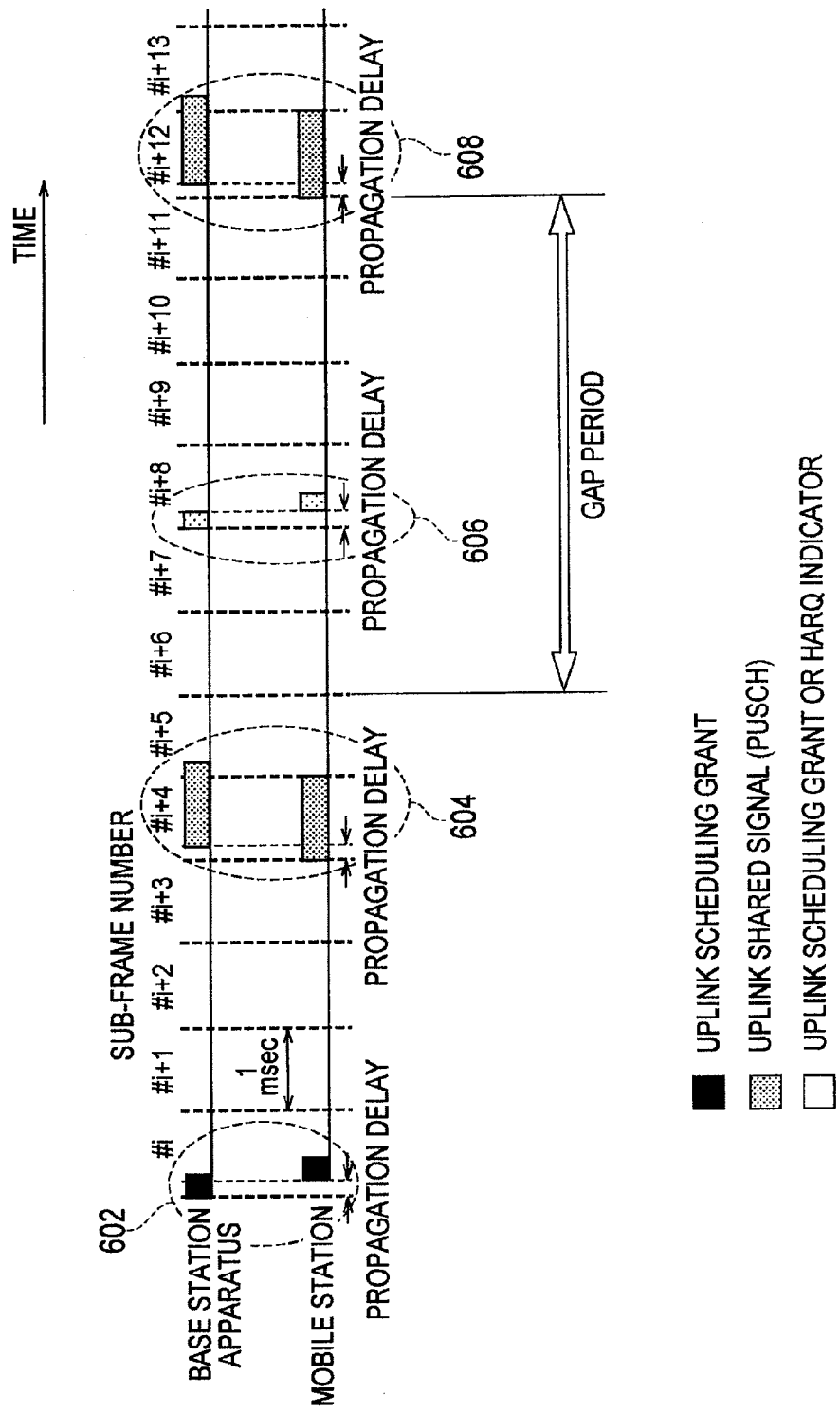
FIG. 6 is a view for explaining a problem of the HARQ retransmission control in the mobile communication system in which the gap period is present.
Figure 7:
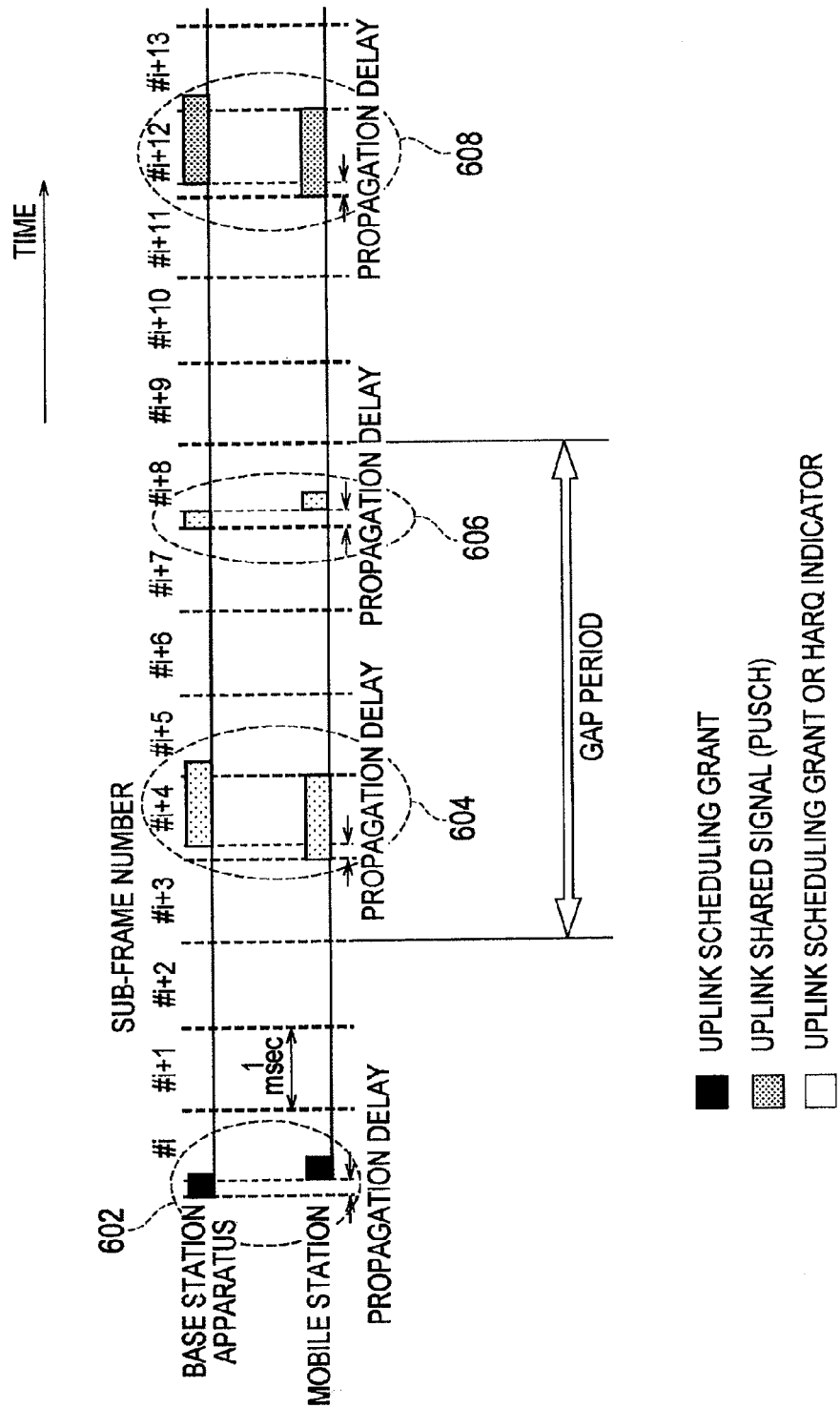
FIG. 7 is a view for explaining another problem of the HARQ retransmission control in the mobile communication system in which the gap period is present.
Figure 8:
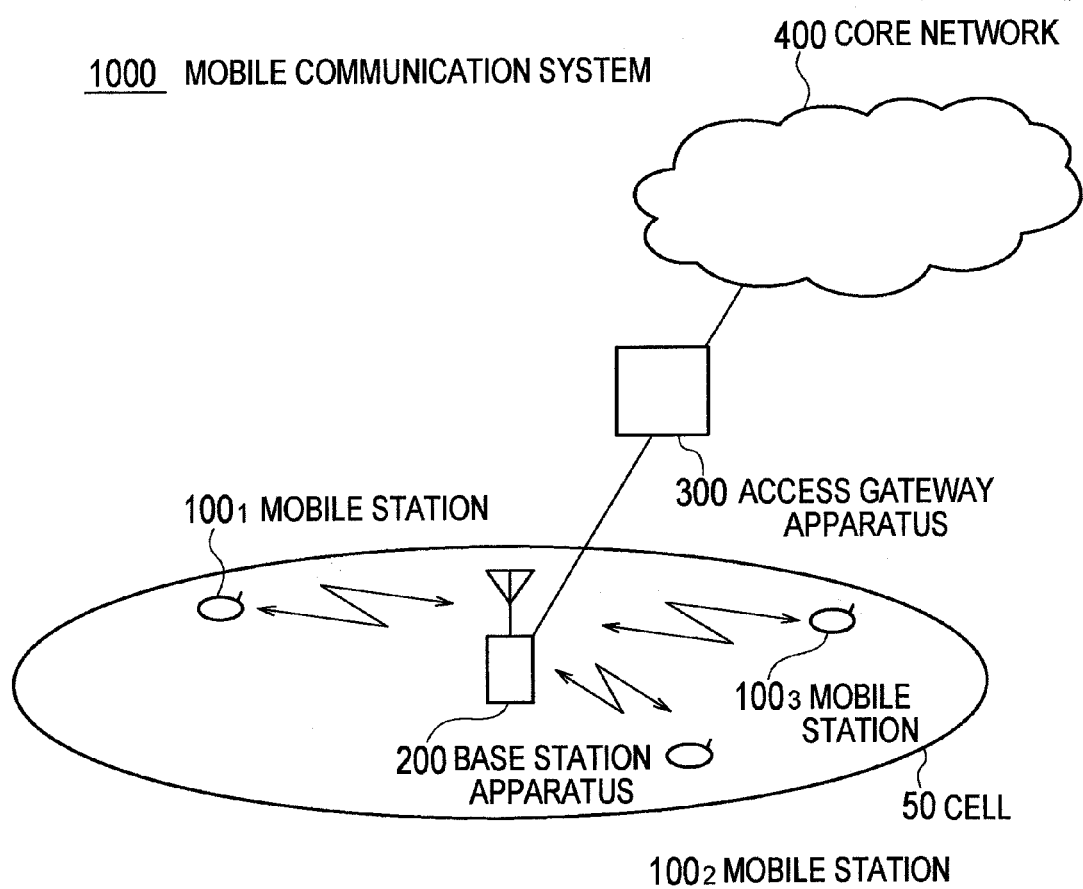
FIG. 8 is an overall configuration diagram of a mobile communication system according to a first embodiment of the present invention.

Configuration of Mobile Communication System According to First Embodiment of Present Invention A configuration of a mobile communication system according to a first embodiment of the present invention will be described with reference to FIG. 8. A mobile communication system 1000 according to this embodiment is a mobile communication system employing the LTE scheme, for example, which includes a plurality of mobile stations $100_1$ to $100_n$, a base station apparatus 200 configured to perform communication with the plurality of mobile stations $100_1$ to $100_n$ by using a shared channel, and an access gateway apparatus (an upper station) 300 connected to the base station apparatus 200 and to a core network 400. The access gateway apparatus may also be referred to as a MME/SGW (mobility management entity/serving gateway).

Note that the above-mentioned LTE scheme may also be referred to as the "evolved UTRA and UTRAN", or "super 3G" scheme. Here, the plurality of mobile stations $100_1$ to $100_n$ are configured to perform communication in a cell 50, with the base station apparatus 200, in accordance with the LTE scheme. In the following, the mobile stations $100_1$, $100_2$, $100_3$, . . . , and $100_n$ have the same configuration, the same function, and the same condition and will therefore be described as the mobile station 100 unless otherwise specified.

The mobile communication system 1000 is configured to use, as a radio access scheme, the OFDM (orthogonal frequency division multiplexing) for a downlink and the SC-FDMA (single-carrier frequency division multiple access) for an uplink.

Here, communication channels in the LTE scheme will be described.

The downlink employs a "physical downlink shared channel (PDSCH)" to be shared and used by the mobile stations 100 and a "physical downlink control channel (PDCCH)".

On the downlink, information on a user or information on a transport format to be mapped on the physical downlink shared channel is notified by downlink scheduling information to be mapped in the above-described PDCCH, and information on the user or information on the transport format to be mapped on an physical uplink shared channel is notified by uplink scheduling grant to be mapped in the PDCCH.

Meanwhile, user data are transmitted by the physical downlink shared channel. Note that DL-SCH is transmitted as a transport channel by the physical downlink shared channel.

Moreover, a HARQ indicator concerning an uplink shared signal is transmitted on the downlink via a HARQ indicator channel. The HARQ indicator channel is a "physical hybrid ARQ indicator channel (PHICH)" as a physical channel.

Information to be notified by using the HARQ indicator may be "ACK: acknowledgement" which is an affirmative response, or may be "NACK: negative acknowledgement" which is a negative response.

The uplink employs a "physical uplink shared channel (PUSCH)" to be shared and used by the mobile stations 100 and an uplink control channel for the LTE scheme.

Note that the uplink control channel has two types, namely, a channel to be time-multiplexed with the physical uplink shared channel and a channel to be frequency-multiplexed with the physical uplink shared channel.

On the uplink, downlink quality information (CQI: channel quality information) to be used for scheduling of the physical uplink shared channel on the downlink or to be used for an adaptive modulation and coding scheme (AMCS), and transmission acknowledgment information (HARQ ACK information) of the physical downlink shared channel are transmitted by the uplink control channel for the LTE mode.

Meanwhile, the user data are transmitted by the physical uplink shared channel. Note that UL-SCH is transmitted as a transport channel by the physical uplink shared channel.

Figure 9:
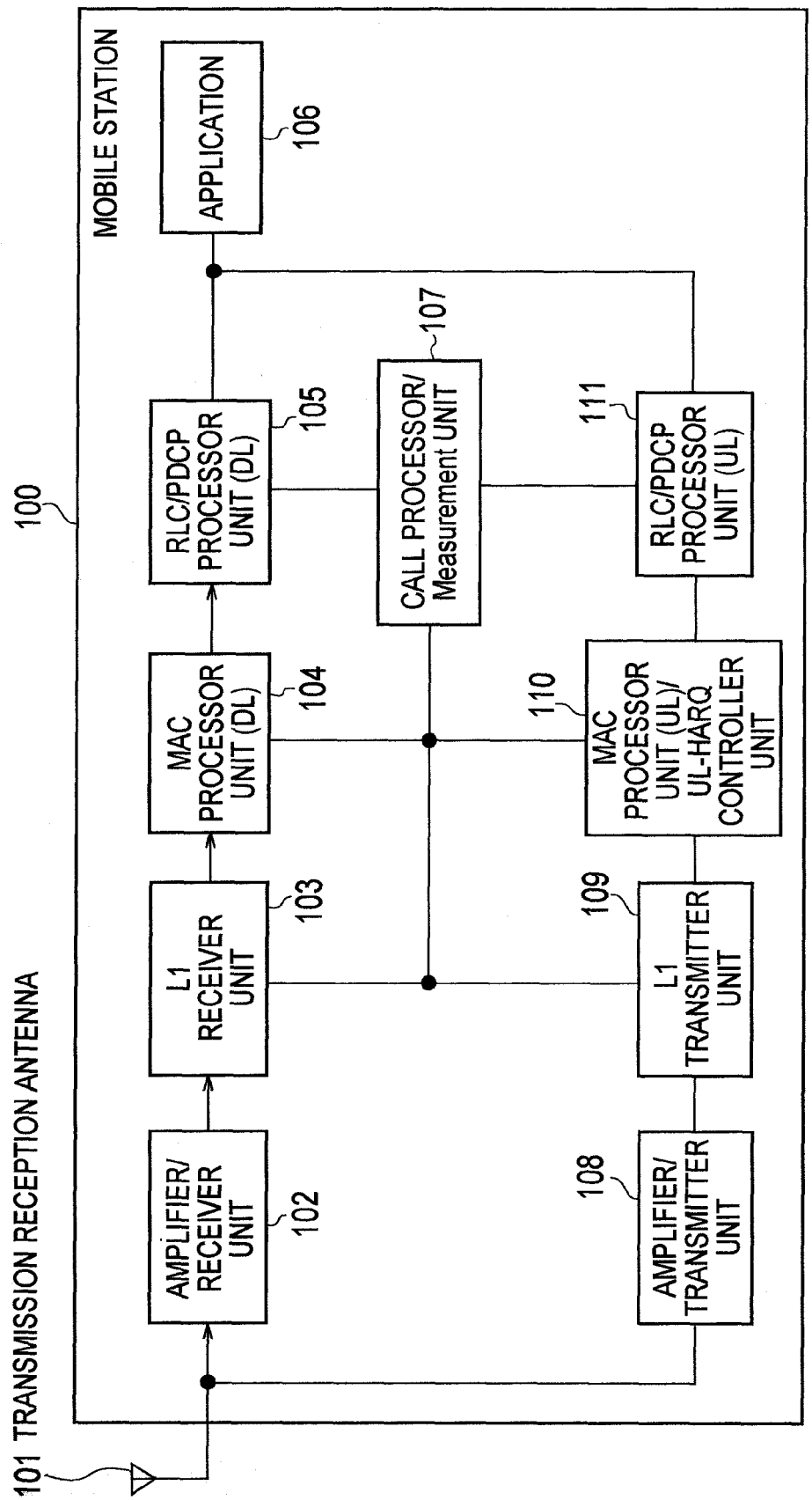
FIG. 9 is a functional block diagram of a mobile station according to the first embodiment of the present invention.

As shown in FIG. 9, the mobile station 100 according to this embodiment includes a transmission reception antenna 101, an amplifier/receiver unit 102, a L1 receiver unit 103, a MAC processor unit (DL) 104, a RLC/PDCP processor unit (DL) 105, an application 106, a call processor/measurement unit 107, an amplifier/transmitter unit 108, a L1 transmitter unit 109, a MAC processor unit (UL)/UL-HARQ controller unit 110, and a RLC/PDCP processor unit (UL) 111.

Specifically, the MAC processor unit (DL) 104 is configured to receive a first downlink control signal (uplink scheduling grant instructing initial transmission) instructing a first time interval (a first period) from the base station apparatus.

Moreover, the MAC processor unit (DL) 104 is configured to receive a second downlink control signal (uplink scheduling grant instructing retransmission or a HARQ indicator) from the base station apparatus at a third time interval which is allocated fixedly.

Further, the MAC processor unit (DL) 104 is configured to receive a third downlink control signal (uplink scheduling grant instructing retransmission) from the base station apparatus.

Here, the MAC processor unit (UL)/UL-HARQ controller unit 110 is configured to transmit an uplink shared signal at the first time interval instructed by the base station apparatus 200 and to retransmit the uplink shared signal at a second time interval which is allocated fixedly.

Specifically, the MAC processor unit (UL)/UL-HARQ controller unit 110 is configured to transmit the uplink shared signal at the first time interval based on the first downlink control signal which is received by the MAC processor unit (DL) 104.

Moreover, the MAC processor unit (UL)/UL-HARQ controller unit 110 is configured to retransmit the uplink shared signal at the second time interval based on the second downlink control signal which is received by the MAC processor unit (DL) 104.

Further, the MAC processor unit (UL)/UL-HARQ controller unit 110 is configured to retransmit the uplink shared signal at a time interval instructed by the third downlink control signal which is received by the MAC processor unit (DL) 104.

Figure 10:
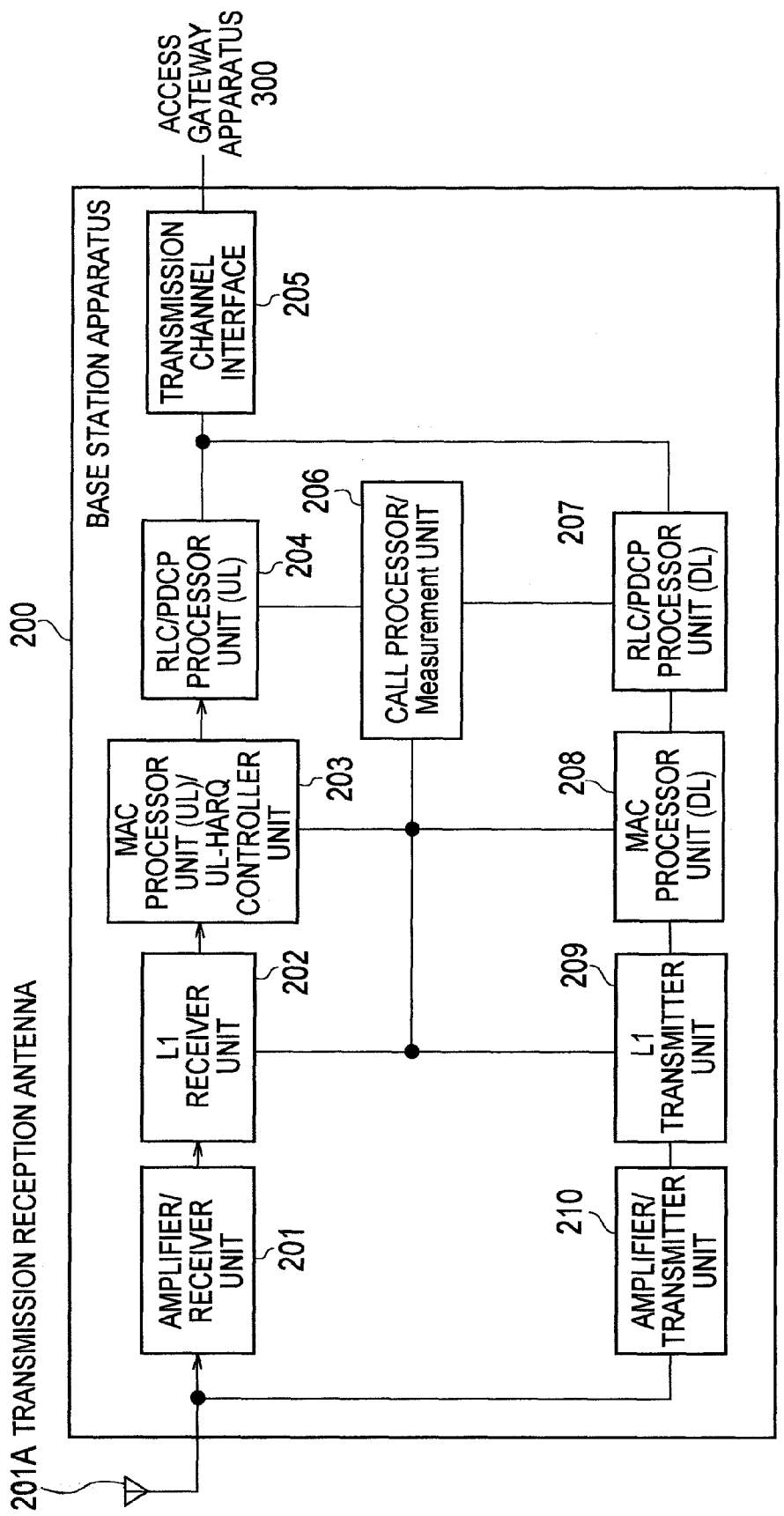
FIG. 10 is a functional block diagram of a base station apparatus according to the first embodiment of the present invention.

As shown in FIG. 10, the base station apparatus 200 according to this embodiment includes a transmission reception antenna 201A, an amplifier/receiver unit 201, a L1 receiver unit 202, a MAC processor unit (UL)/UL-HARQ controller unit 203, a RLC/PDCP processor unit (UL) 204, a transmission channel interface 205, a call processor unit/measurement unit 206, a RLC/PDCP processor unit (DL) 207, a MAC processor unit (DL) 208, a L1 transmitter unit 209, and an amplifier unit/transmitter unit 210.

Here, the MAC processor unit (UL)/UL-HARQ controller unit 203 is configured to receive the uplink shared signal from the mobile station 100.

Specifically, the MAC processor unit (UL)/UL-HARQ controller unit 203 is configured to receive the uplink shared signal at the first time interval, which is transmitted by the mobile station 100 based on the first downlink control signal.

Moreover, the MAC processor unit (UL)/UL-HARQ controller unit 203 is configured to receive the uplink shared signal at the second time interval, which is retransmitted by the mobile station 100 based on the second downlink control signal.

The MAC processor unit (DL) 208 is configured to transmit the first downlink control signal, which instructs the first time interval for transmitting the uplink shared signal, to the mobile station 100.

Moreover, the MAC processor unit (DL) 208 is configured to transmit the second downlink control signal at the third time interval, which is allocated fixedly, based on a result of reception by the MAC processor unit (UL)/UL-HARQ controller unit 203.

Operations of Mobile Communication System according to First Embodiment of Present Invention)

Hereinbelow, with reference to FIG. 11 to FIG. 22, description will be given of concrete operations of HARQ control on the uplink to be executed by the mobile communication system according to the first embodiment of the present invention.

<Pattern 1>

Pattern 1 of the HARQ control will be described with reference to FIG. 11. Pattern 1 of the HARQ control is the HARQ control applicable to the case where the first time interval does not overlap a gap period (a time interval (a measurement gap) for measurement by the mobile station 100) but the third time interval overlaps the gap period.

Here, the gap period (a measurement gap period) is the time interval for measuring reception quality of an adjacent cell of the same frequency, an adjacent cell of a different frequency or an adjacent cell in a different system.

Figure 11:
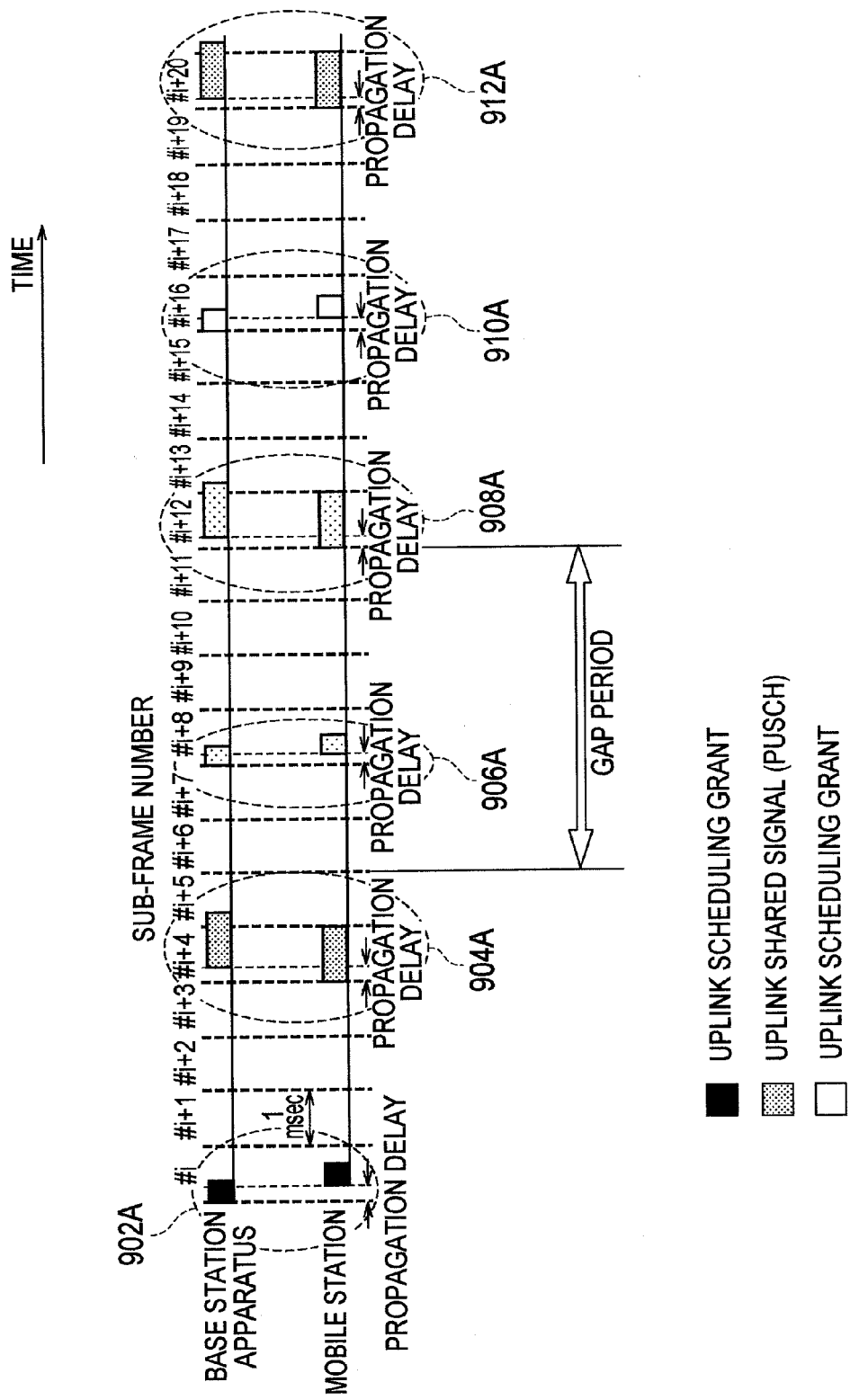
FIG. 11 is a view for explaining an operation (Pattern 1) of the mobile communication system according to the first embodiment of the present invention.

In this case, the mobile station 100 is configured to transmit the uplink shared signal at the first time interval (reference numeral 904A in FIG. 11, a sub-frame #i+4) and not to retransmit the uplink shared signal at the second time interval (reference numeral 908A in FIG. 11, a sub-frame #i+12).

Moreover, when the third downlink control signal is received (reference numeral 910A in FIG. 11, a sub-frame #i+16), the mobile station 100 is configured to retransmit the uplink shared signal at a time interval (reference numeral 912A, a sub-frame #i+20) instructed by the third downlink control signal.

Meanwhile, the base station apparatus 200 is configured to receive the uplink shared signal at the first time interval (reference numeral 904A in FIG. 11, the sub-frame #i+4), not to transmit the second downlink control signal at the third time interval (reference numeral 906A in FIG. 11, a sub-frame #i+8), and not to receive the uplink shared signal at the second time interval (reference numeral 908A in FIG. 11, the sub-frame #i+12).

Hereinbelow, with reference to FIG. 11, description will be given of concrete operations of the base station apparatus 200 and the mobile station 100 in the case where the gap period does not include the sub-frame for transmitting the uplink shared signal but includes the sub-frame for transmitting the HARQ indicator concerning the uplink shared signal or the uplink scheduling grant instructing retransmission, and where a decoding result of the uplink shared signal (a decoding result at reference numeral 904A) is NG.

At reference numeral 902A (a sub-frame #i) (where i is an integer satisfying i>0), the base station apparatus 200 uses the uplink scheduling grant on the physical downlink control channel and instructs the mobile station 100 to perform communication using the uplink shared channel at the sub-frame #i+4.

At reference numeral 904A (the sub-frame #i+4), the mobile station 100 transmits the uplink shared signal to the base station apparatus 200 via the uplink shared channel, and the base station apparatus 200 receives the uplink shared signal and decodes the uplink shared signal. In the example in FIG. 11, the decoding result is assumed to be NG.

At reference numeral 906A (the sub-frame #i+8), the base station apparatus 200 transmits neither the HARQ indicator nor the uplink scheduling grant to the mobile station 100.

This is because the sub-frame #i+8 is included in the gap period of the mobile station 100 and the mobile station 100 cannot receive the HARQ indicator or the uplink scheduling grant even if the HARQ indicator or the uplink scheduling grant is transmitted.

At reference numeral 908A (the sub-frame #i+12), the mobile station 100 does not retransmit the uplink shared signal which was transmitted at reference numeral 904A.

In this case, the mobile station 100 may be deemed to be notified of ACK via the HARQ indicator channel at reference numeral 906A. Specifically, at reference numeral 906A, the mobile station 100 performs an operation which is similar to the case of being notified of ACK via the HARQ indicator channel.

Meanwhile, at reference numeral 908A, the base station apparatus 200 also assumes that the uplink shared signal is not retransmitted and hence does not perform decoding processing of the uplink shared signal.

At a sub-frame (a time interval) not overlapping the gap period, for example, at reference numeral 910A (the sub-frame #i+16), the base station apparatus 200 instructs the mobile station 100 to perform retransmission of the uplink shared signal, which was transmitted at reference numeral 904A, by using the uplink scheduling grant on the physical downlink control channel at the sub-frame #i+20.

At reference numeral 912A (the sub-frame #i+20), the mobile station 100 retransmits the uplink shared signal, which was transmitted at reference numeral 904A, to the base station apparatus 200, and the base station apparatus 200 receives the retransmitted uplink shared signal and performs decoding.

Although the base station apparatus 200 transmits the uplink scheduling grant to the mobile station 100 at reference numeral 910A in the above-described example, the base station apparatus 200 does not have to transmit the uplink scheduling grant to the mobile station 100 at reference numeral 910A.

For example, when there are no radio resources for transmitting the uplink scheduling grant or when there are no radio resources for retransmitting the uplink shared signal, the base station apparatus 200 does not have to transmit the uplink scheduling grant to the mobile station 100.

In this case, the mobile station 100 does not perform retransmission of the uplink shared signal at reference numeral 912A which was transmitted at reference numeral 904A. This is the same operation as the case where ACK was transmitted via the HARQ indicator channel at reference numeral 906A (which is the same operation as reference numerals 910B and 912B).

In this case as well, if the uplink scheduling grant instructing retransmission of the uplink shared signal, which was transmitted at reference numeral 904A, is further transmitted at a subsequent retransmission timing, for example, at a sub-frame #i+24, then the mobile station 100 may perform retransmission of the uplink shared signal at a sub-frame #i+28, which was transmitted at reference numeral 904A.

Figure 12:
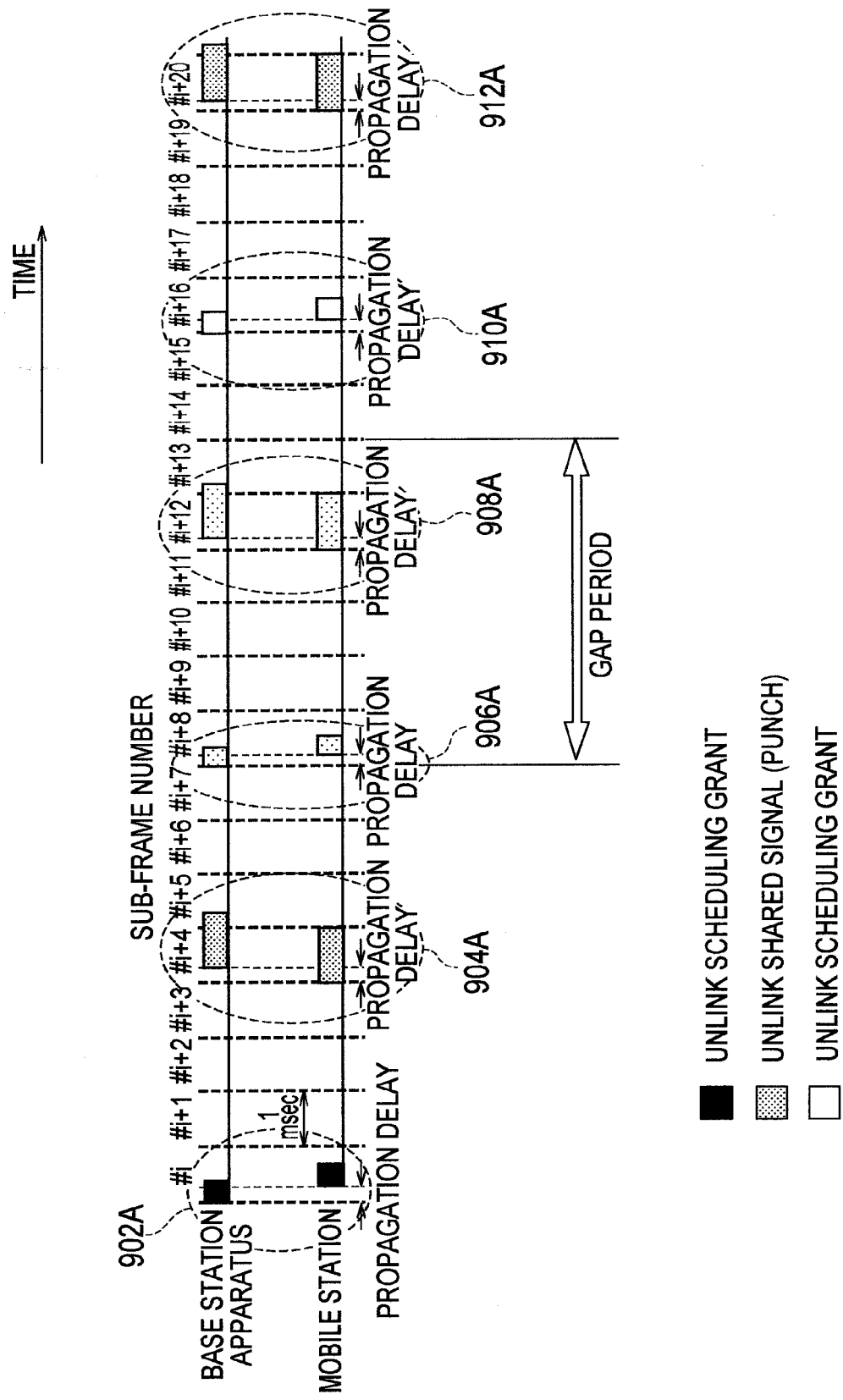
FIG. 12 is another view for explaining the operation (Pattern 1) of the mobile communication system according to the first embodiment of the present invention.

Here, the above-described processing may also be applied to the case where both of the third time interval and the second time interval overlap the gap period as shown in FIG. 12. In this processing, a major problem does not occur as the uplink shared signal is not transmitted or received at the second time interval (reference numeral 908A in FIG. 12, a sub-frame #i+12). Moreover, it is possible to obtain a similar effect to the case in FIG. 11.

<Pattern 2>

Pattern 2 of the HARQ control will be described with reference to FIG. 13. Pattern 2 of the HARQ control is the HARQ control applicable to the case where the first time interval does not overlap the gap period (the time interval for measurement by the mobile station 100) but the third time interval overlaps the gap period.

Hereinbelow, with reference to FIG. 13, description will be given of operations of the base station apparatus 200 and the mobile station 100 in the case where the gap period does not include the sub-frame for transmitting the uplink shared signal but includes the sub-frame for transmitting the HARQ indicator concerning the uplink shared signal or the uplink scheduling grant instructing retransmission, and where a decoding result of the uplink shared signal (a decoding result at reference numeral 904B) is OK.

At reference numeral 902B (a sub-frame #i) (where i is an integer satisfying i>0), the base station apparatus 200 uses the uplink scheduling grant on the physical downlink control channel and instructs the mobile station 100 to perform communication using the uplink shared channel at the sub-frame #i+4.

At reference numeral 904B (a sub-frame number #i+4), the mobile station 100 transmits the uplink shared signal to the base station apparatus 200, and the base station apparatus 200 receives the uplink shared signal and decodes the uplink shared signal. In FIG. 13, the decoding result is assumed to be OK.

At reference numeral 906B (a sub-frame #i+8), the base station apparatus 200 transmits neither the HARQ indicator nor the uplink scheduling grant to the mobile station 100.

This is because the sub-frame #i+8 is included in the gap period of the mobile station 100 and the mobile station 100 cannot receive the HARQ indicator or the uplink scheduling grant even if the HARQ indicator or the uplink scheduling grant is transmitted.

At reference numeral 908B (a sub-frame #i+12), the mobile station 100 does not retransmit the uplink shared signal which was transmitted at reference numeral 904B.

In this case, the mobile station 100 may be deemed to be notified of ACK by the HARQ indicator at reference numeral 906B. Specifically, at reference numeral 906B, the mobile station 100 performs an operation which is similar to the case of being notified of ACK via the HARQ indicator channel.

Meanwhile, at reference numeral 908B, the base station apparatus 200 also assumes that the uplink shared signal is not retransmitted and hence does not perform decoding processing of the uplink shared signal.

At reference numeral 910B (a sub-frame #i+16), the base station apparatus 200 does not transmit the uplink scheduling grant instructing the mobile station 100 to perform retransmission of the uplink shared signal, which was transmitted at reference numeral 904B.

This is because the uplink shared signal transmitted at reference numeral 904B has already been correctly decoded.

Therefore, the mobile station 100 transmits nothing to the base station apparatus 200 at reference numeral 912B (a sub-frame #i+20).

Here, at reference numeral 910B, the base station apparatus 200 may transmit the uplink scheduling grant instructing the mobile station 100 to transmit a new uplink shared signal. In this case, at reference numeral 912B, the mobile station 100 transmits the new uplink shared signal to the base station apparatus 200 based on the uplink scheduling grant.

Figure 13:
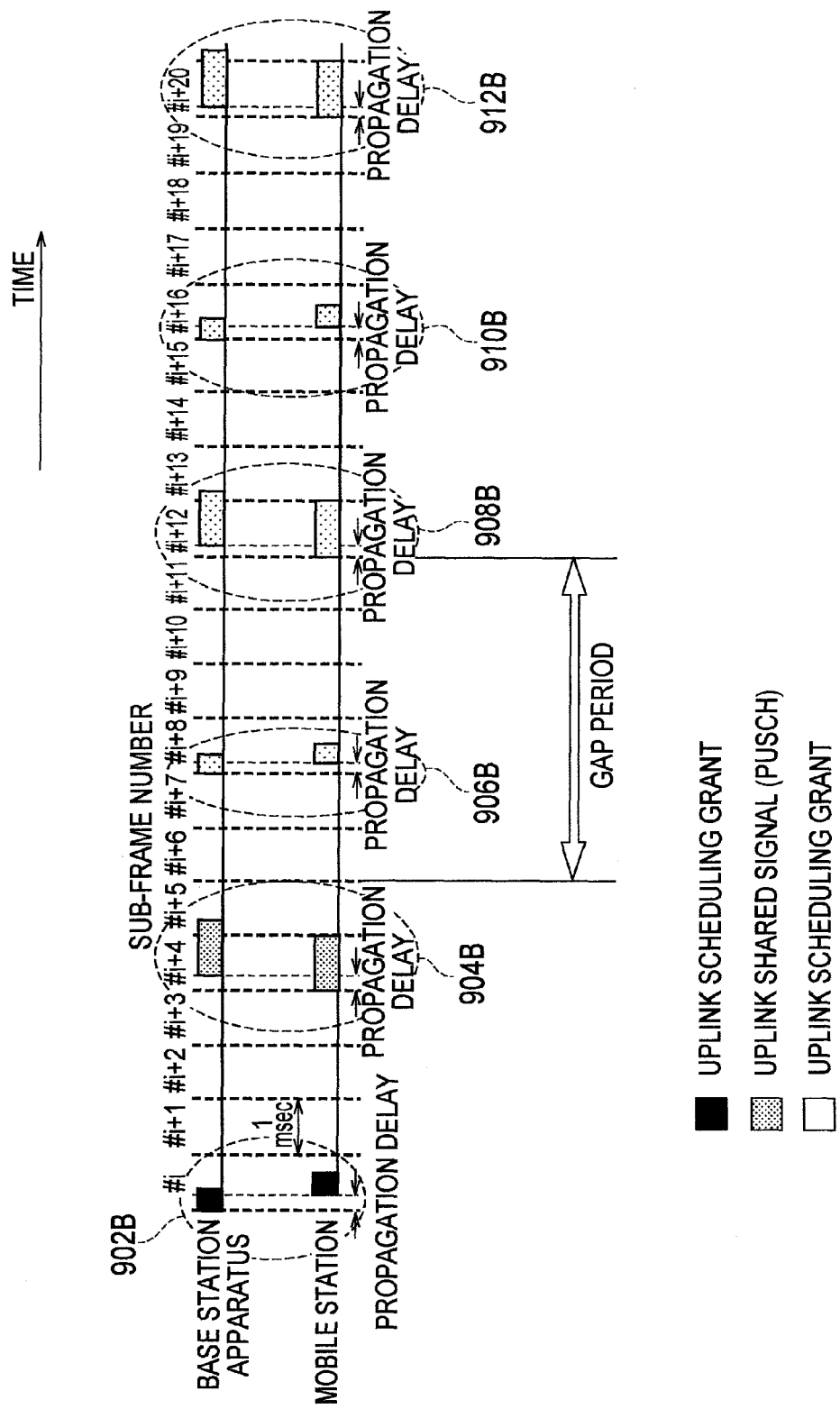
FIG. 13 is a view for explaining an operation (Pattern 2) of the mobile communication system according to the first embodiment of the present invention.
Figure 14:
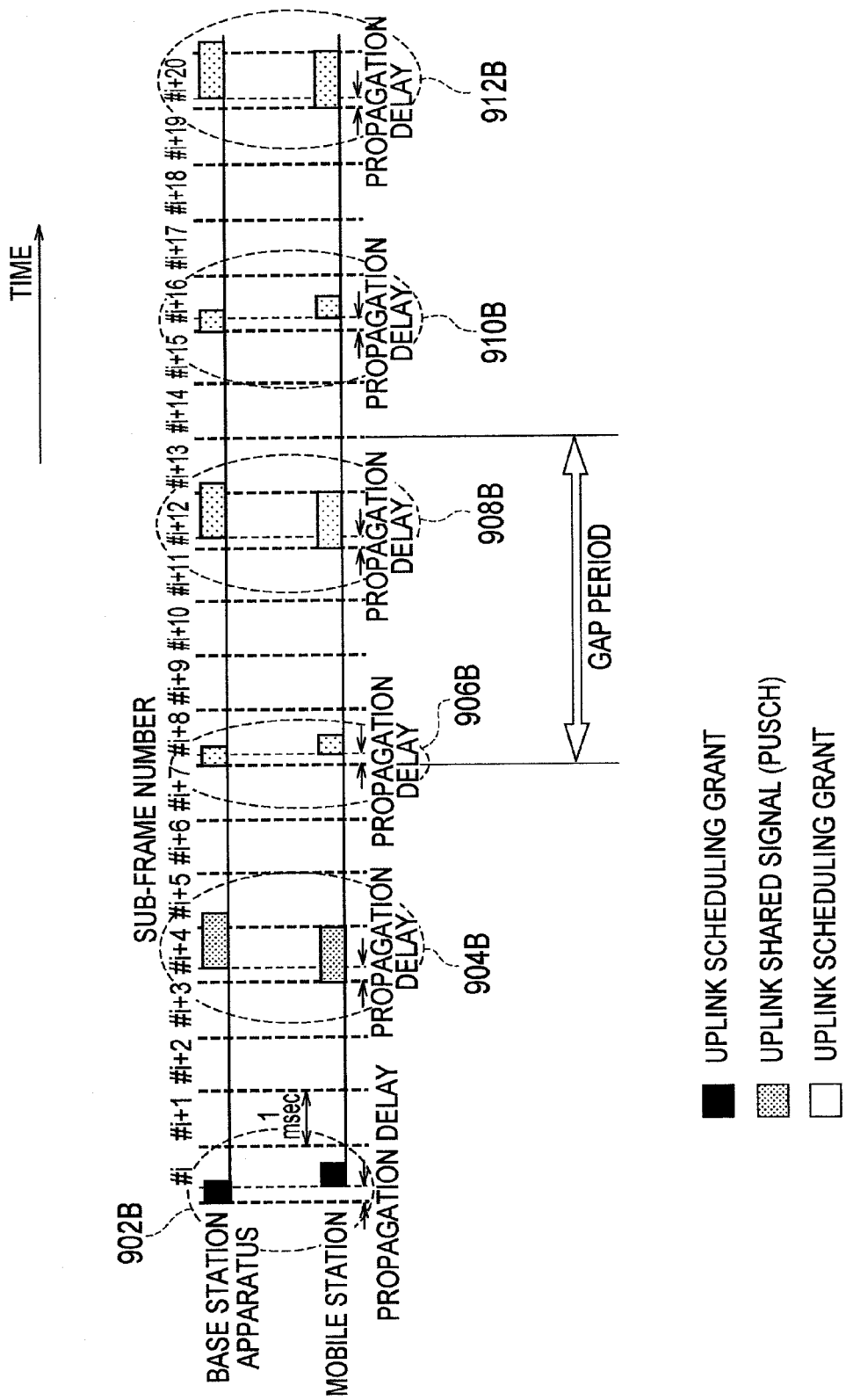
FIG. 14 is another view for explaining the operation (Pattern 2) of the mobile communication system according to the first embodiment of the present invention.

Here, the above-described processing may also be applied to the case where both of the third time interval and the second time interval overlap the gap period as shown in FIG. 14. In this processing, a major problem does not occur as the uplink shared signal is not transmitted or received at the second time interval (reference numeral 908B in FIG. 14, a sub-frame #i+12). Moreover, it is possible to obtain a similar effect to the case in FIG. 13.

To sum up the processing of the base station apparatus 200 and the mobile station 100 in FIG. 11 and FIG. 13, when a time frame (a sub-frame) for transmitting the HARQ indicator concerning the uplink shared signal or the uplink scheduling grant relative to the uplink shared signal is included in the gap period, the mobile station 100 presumes that the uplink shared signal is correctly decoded and therefore does not perform retransmission of the uplink shared signal.

Specifically, the mobile station 100 presumes that the HARQ indicator channel included in the gap period has indicated ACK. In this case, the uplink shared signal will not be retransmitted until retransmission is instructed by the uplink scheduling grant.

Meanwhile, if the above-described uplink shared signal is not correctly decoded (reference numeral 904A), the base station apparatus 200 instructs retransmission of the uplink shared signal (reference numeral 910A) at a later timing (a sub-frame) by use of the uplink scheduling grant.

Effects of the mobile communication system (Pattern 1/2) according to the first embodiment of the present invention are as follows.

On the uplink in the LTE scheme, AMC (adaptive modulation and coding) is generally performed so as to achieve an error rate of the uplink shared signal in a range from 10% to 30%. Accordingly, at reference numeral 904A or 904B, a probability that the uplink shared signal is correctly decoded is higher than a probability that the uplink shared signal is not correctly decoded.

Therefore, by presuming that the HARQ indicator supposed to be transmitted at reference numeral 906A is ACK and not performing retransmission of the uplink shared signal at reference numeral 908A or 908B which was transmitted at reference numeral 904A or 904B, it is possible to allocate radio resources at reference numeral 908A or 908B to another mobile station or to new data transmission by the mobile station 100, and to realize efficient communication as a consequence.

Here, even if the uplink shared signal is not correctly decoded at reference numeral 904A, it is possible to instruct retransmission of the uplink shared signal, which was transmitted at reference numeral 904A, at a later timing (a sub-frame) by using the uplink scheduling grant as shown at reference numerals 910A and 912A. Since an opportunity of retransmission is not lost, a problem does not occur at reference numeral 904A, even when the HARQ indicator supposed to be transmitted at reference numeral 906A is regarded as ACK.

Specifically, the expression "the HARQ indicator is ACK or regarded as ACK" in this embodiment may be interpreted to mean that "retransmission of the uplink shared signal may be withheld at an immediately subsequent retransmission timing" instead of meaning that "the uplink shared signal is correctly received".

Then, retransmission is executed on the condition that the uplink scheduling grant instructing retransmission is received.

Therefore, even if the mobile station 100 receives ACK or is deemed to receive the ACK according to this definition, the data in the transmitted uplink shared signal must not be discarded but need to be retained in a retransmission buffer.

The mobile station 100 will discard the data in the above-described transmitted uplink shared signal, when the mobile station 100 is instructed to perform new transmission using a HARQ process by which ACK is received or is deemed to be received from the base station apparatus 200, or when the number of HARQ retransmission exceeds a maximum retransmission number.

While FIG. 11 and FIG. 13 show the case where either the HARQ indicator concerning the initially transmitted uplink shared signal or the uplink scheduling grant instructing retransmission is included in the gap period, similar processing is also applied to the case where either the HARQ indicator concerning the uplink shared signal or the uplink scheduling grant instructing retransmission, transmitted in a second transmission or thereafter, is included in the gap period.

In this case, the uplink scheduling grant at reference numerals 902A and 902B may be the HARQ indicator instructing retransmission or the uplink scheduling grant instructing retransmission.

<Pattern 3>

Pattern 3 of the HARQ control will be described with reference to FIG. 15. Pattern 3 of the HARQ control is the HARQ control applicable to the case where the first time interval does not overlap the gap period (the time interval for measurement by the mobile station 100) but the third time interval overlaps the gap period.

Figure 15:
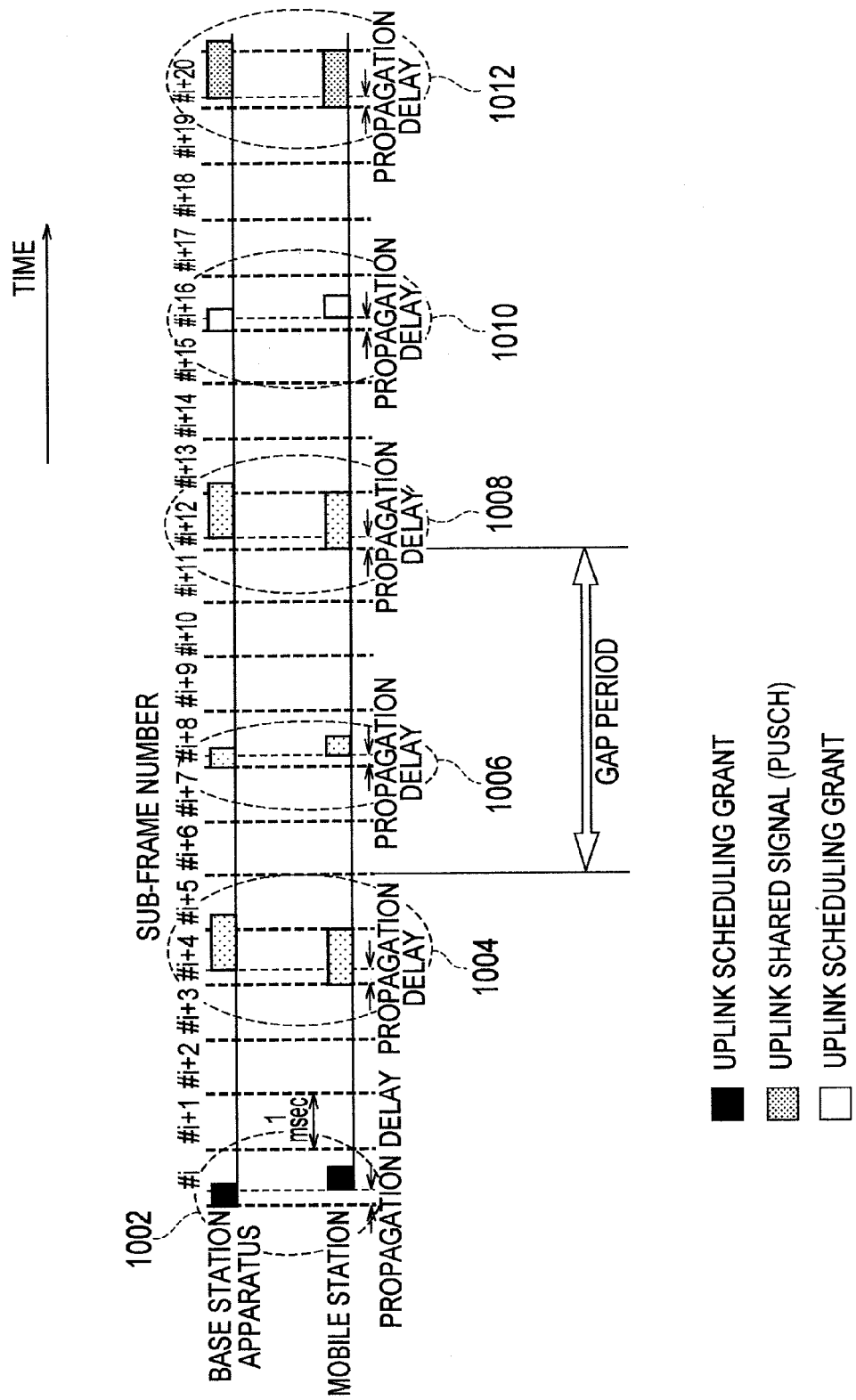
FIG. 15 is a view for explaining an operation (Pattern 3) of the mobile communication system according to the first embodiment of the present invention.

In this case, the mobile station 100 is configured not to transmit the uplink shared signal at the first time interval (reference numeral 1004 in FIG. 15, a sub-frame #i+4) and not to retransmit the uplink shared signal at the second time interval (reference numeral 1008 in FIG. 15, a sub-frame #i+12).

Hereinbelow, with reference to FIG. 15, description will be given of operations of the base station apparatus 200 and the mobile station 100 in the case where the gap period does not include the sub-frame for transmitting the uplink shared signal but includes the sub-frame for transmitting the HARQ indicator concerning the uplink shared signal or the uplink scheduling grant instructing retransmission.

As shown in FIG. 15, at reference numeral 1002 (a sub-frame #i) (where i is an integer satisfying i>0), the base station apparatus 200 uses the uplink scheduling grant on the physical downlink control channel and instructs the mobile station 100 to perform communication using the uplink shared channel at the sub-frame #i+4.

However, at reference numeral 1004 (the sub-frame number #i+4), the mobile station 100 does not transmit the uplink shared signal to the base station apparatus 200 while the base station apparatus 200 does not perform reception of the uplink shared signal.

This is because a sub-frame i+8 being the sub-frame for transmitting either the HARQ indicator concerning the uplink shared signal or the uplink scheduling grant instructing retransmission is included in the gap period of the mobile station 100.

Specifically, even if the mobile station 100 transmits the uplink shared signal, the HARQ indicator concerning the uplink shared signal or the uplink scheduling grant instructing retransmission cannot be received due to the gap period. Accordingly, transmission of the uplink shared signal itself is cancelled.

At reference numeral 1006 (a sub-frame #i+8), the base station apparatus 200 transmits neither the HARQ indicator nor the uplink scheduling grant to the mobile station 100.

This is because the sub-frame #i+8 is included in the gap period of the mobile station 100, and the mobile station 100 cannot receive the HARQ indicator or the uplink scheduling grant, even if the HARQ indicator or the uplink scheduling grant is transmitted.

At reference numeral 1008 (the sub-frame #i+12), the mobile station 100 does not perform retransmission of the uplink shared signal which was supposed to be transmitted at reference numeral 1004.

In this case, the mobile station 100 may be deemed to be notified of ACK via the HARQ indicator channel at reference numeral 1006. Specifically, at reference numeral 1006, the mobile station 100 performs an operation which is similar to the case of being notified of ACK via the HARQ indicator channel.

Meanwhile, at reference numeral 1008, the base station apparatus 200 also assumes that the uplink shared signal is not retransmitted and hence does not perform decoding processing of the uplink shared signal.

At reference numeral 1010 (a sub-frame #i+16), the base station apparatus 200 instructs the mobile station 100 to perform retransmission of the uplink shared signal, which was supposed to be transmitted at reference numeral 1004, by using the uplink scheduling grant on the physical downlink control channel at a sub-frame #i+20.

At reference numeral 1012 (the sub-frame #i+20), the mobile station 100 retransmits the uplink shared signal, which was supposed to be transmitted at reference numeral 1004, to the base station apparatus 200, and the base station apparatus 200 receives and decodes the retransmitted uplink shared signal. Here, the HARQ control after reference numeral 1012 becomes the same as the normal HARQ control.

Although the base station apparatus 200 transmits the uplink scheduling grant to the mobile station 100 at reference numeral 1010 in the above-described example, the base station apparatus 200 does not have to transmit the uplink scheduling grant to the mobile station 100 at reference numeral 1010.

For example, when there are no radio resources for transmitting the uplink scheduling grant or when there are no radio resources for retransmitting the uplink shared signal, the base station apparatus 200 does not have to transmit the uplink scheduling grant to the mobile station 100.

In this case, the mobile station 100 does not perform retransmission of the uplink shared signal at reference numeral 1012 which was supposed to be transmitted at reference numeral 1004. This is the same operation as the case where ACK was transmitted via the HARQ indicator channel at reference numeral 1006.

In this case as well, if the uplink scheduling grant instructing retransmission of the uplink shared signal, which was supposed to be transmitted at reference numeral 1004, is further transmitted at a subsequent retransmission timing, for example, at a sub-frame #i+24, then the mobile station 100 may perform retransmission of the uplink shared signal at a sub-frame #i+28, which was supposed to be transmitted at reference numeral 1004.

Figure 16:
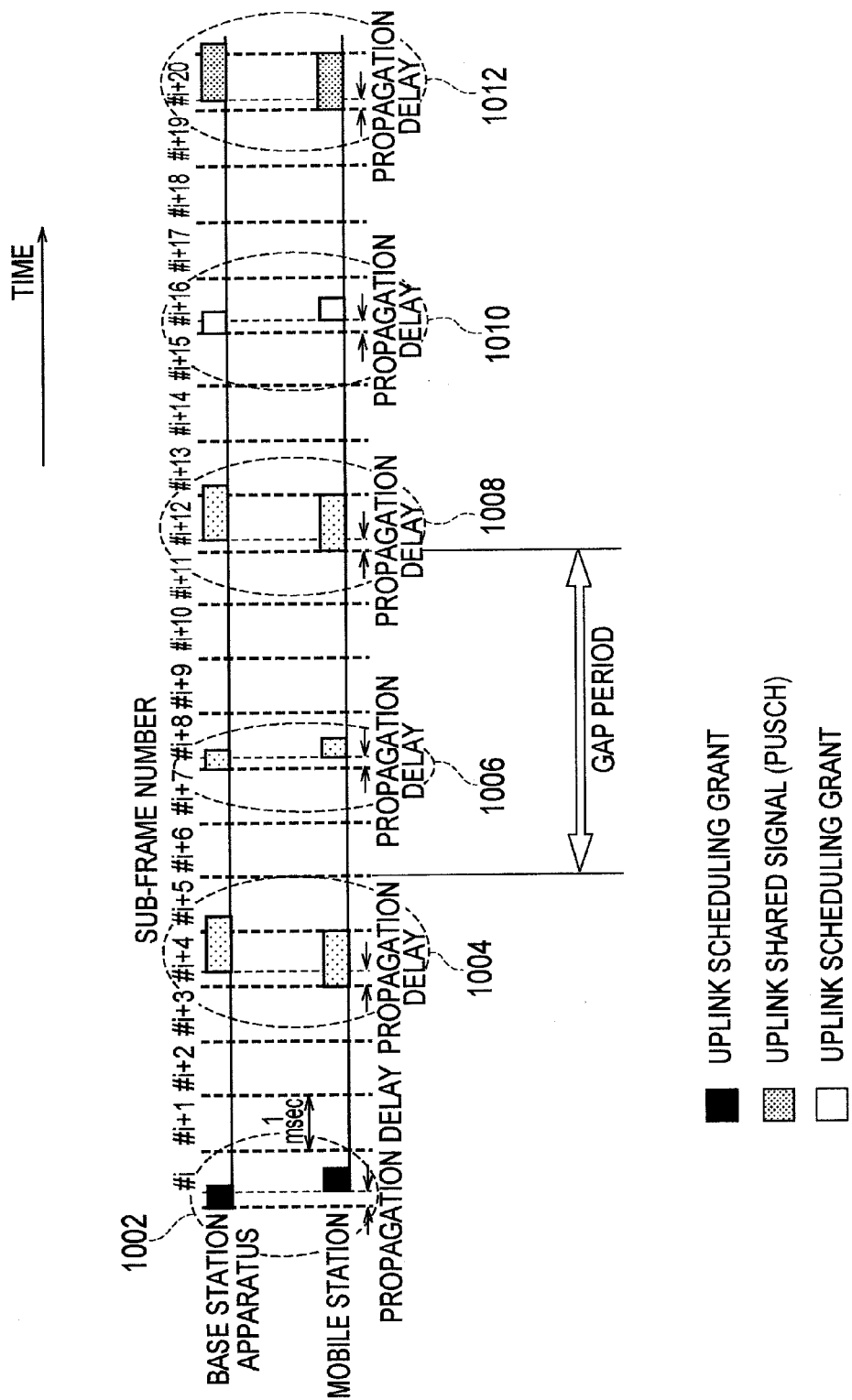
FIG. 16 is another view for explaining the operation (Pattern 3) of the mobile communication system according to the first embodiment of the present invention.

Here, the above-described processing may also be applied to the case where both of the third time interval and the second time interval overlap the gap period as shown in FIG. 16. In this processing, a major problem does not occur as the uplink shared signal is not transmitted or received at the second time interval (reference numeral 1008 in FIG. 16, a sub-frame #i+12). Moreover, it is possible to obtain a similar effect to the case in FIG. 15.

To sum up the processing of the base station apparatus 200 and the mobile station 100 in FIG. 15, when the time frame (the sub-frame) for transmitting the HARQ indicator concerning the uplink shared signal or the uplink scheduling grant relative to the uplink shared signal is included in the gap period, the mobile station 100 stops transmission of the uplink shared signal in itself.

Moreover, the mobile station 100 presumes that the HARQ indicator channel included in the gap period has indicated ACK and performs subsequent processing. Specifically, the mobile station 100 will not perform retransmission of the uplink shared signal until retransmission is instructed by the uplink scheduling grant.

Meanwhile, the base station apparatus 200 instructs retransmission of the uplink shared signal at a later timing by use of the uplink scheduling grant (reference numeral 1010).

Here, the expression "the HARQ indicator is ACK or regarded as ACK" in this embodiment may be interpreted to mean that "retransmission of the uplink shared signal may be withheld at an immediately subsequent retransmission timing" instead of meaning that "the uplink shared signal is correctly received".

Then, retransmission is executed on the condition that the uplink scheduling grant instructing retransmission is received.

Therefore, even if the mobile station 100 receives ACK or is deemed to receive the ACK according to this definition, the data in the transmitted uplink shared signal must not be discarded but need to be retained in the retransmission buffer.

The mobile station 100 will discard the data in the above-described transmitted uplink shared signal, when the mobile station 100 is instructed to perform new transmission using the HARQ process by which ACK is received or is deemed to be received from the base station apparatus 200, or when the number of HARQ retransmission exceeds the maximum retransmission number.

Effects of the mobile communication system (Pattern 3) according to the first embodiment of the present invention are as follows.

In general, the HARQ control is essentially composed of transmission acknowledgment information (the HARQ indicator or the uplink scheduling grant in this case).

Accordingly, when it is apparent from the beginning that the transmission acknowledgment information will not be correctly received by the mobile station 100, the safest control method is to stop transmission of the original data signal itself (the uplink shared signal in this case).

Meanwhile, by applying the operation not to allow the mobile station 100 to perform retransmission of the uplink shared signal until the uplink scheduling grant instructs retransmission, it is possible to allocate resources flexibly at reference numeral 1008 in FIG. 15, for example. Specifically, it is possible to apply the safe and efficient uplink HARQ control by performing the processing shown in FIG. 15.

The above-described flexible allocation of resources will be supplemented as follows. If a PRACH (physical random access channel) signal is transmitted via a retransmitted sub-frame on the uplink, there arises a problem that the above-mentioned PRACH signal conflicts with the retransmitted uplink shared signal.

In this case, processing is generally carried out in which the uplink scheduling grant is transmitted for transmission of the above-described retransmitted uplink shared signal, and a frequency resource of the retransmitted uplink shared signal is changed so that the retransmitted uplink shared signal does not conflict with the above-described PRACH signal.

However, in the case shown in FIG. 15, it is not possible to carry out the above-described processing, because the sub-frame (reference numeral 1006) where the uplink scheduling grant is transmitted is included in the gap period. That is to say, there may arise the problem that the PRACH signal conflicts with the above-described retransmitted uplink shared signal at reference numeral 1008.

As described previously, it is possible to perform flexible allocation of resources at reference numeral 1008 in FIG. 15, for example, by causing the mobile station 100 not to perform retransmission of the uplink shared signal until retransmission is instructed by the uplink scheduling grant. Here, flexible allocation of resources includes avoidance of the conflict between the PRACH signal and the retransmitted uplink shared signal, for example.

While FIG. 15 shows the case where either the HARQ indicator concerning the initially transmitted uplink shared signal or the uplink scheduling grant instructing retransmission is included in the gap period, similar processing is also applied to the case where either the HARQ indicator concerning the uplink shared signal or the uplink scheduling grant instructing retransmission, transmitted in a second transmission or thereafter, is included in the gap period.

In this case, the uplink scheduling grant at reference numeral 1002 in FIG. 15 may be the HARQ indicator instructing retransmission or the uplink scheduling grant instructing retransmission.

<Pattern 4>

Figure 17:
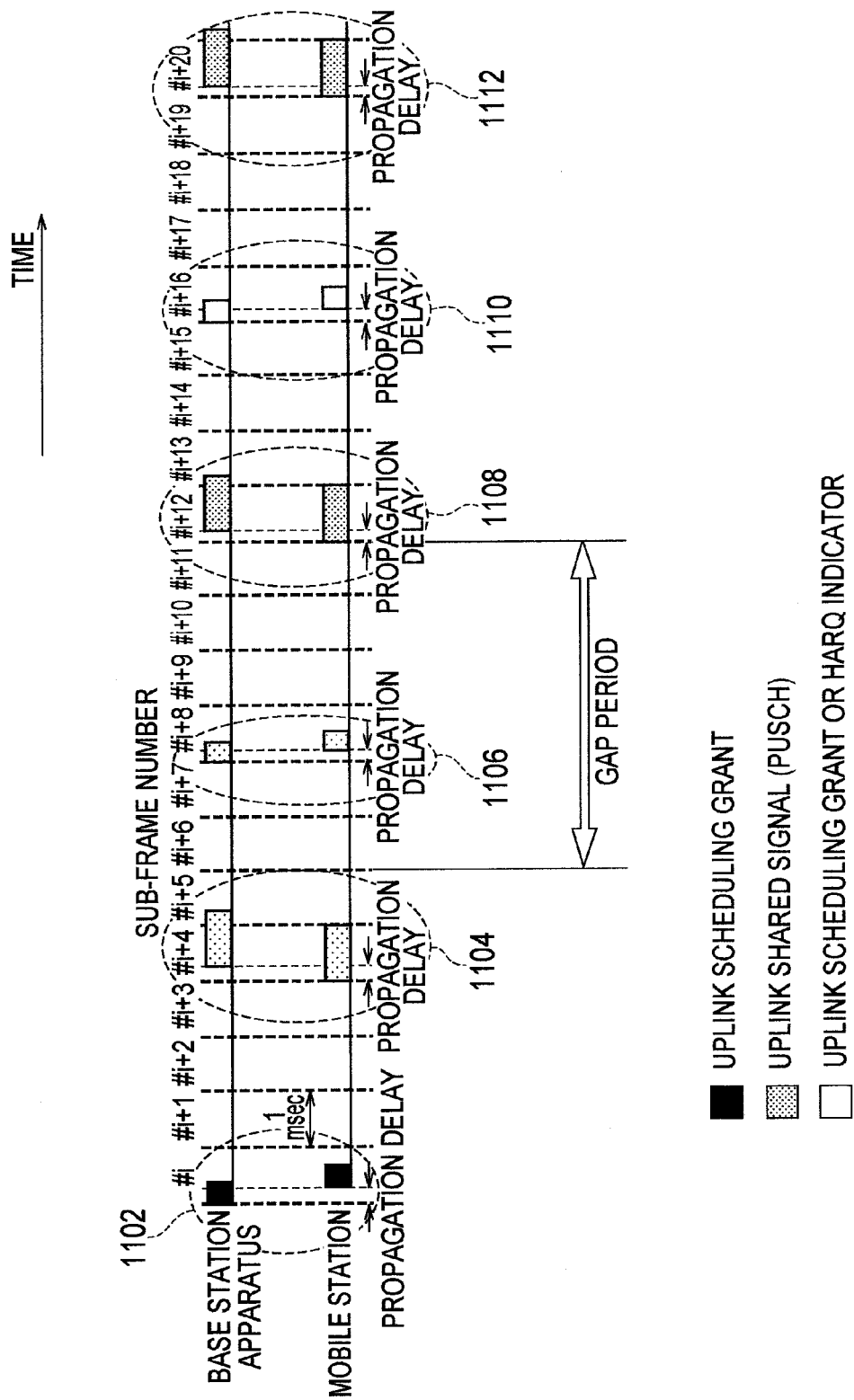
FIG. 17 is a view for explaining an operation (Pattern 4) of the mobile communication system according to the first embodiment of the present invention.

Pattern 4 of the HARQ control will be described with reference to FIG. 17. In the following, Pattern 4 of the HARQ control will be described while focusing on differences from Patterns 1 to 3 of the HARQ control described above.

Pattern 4 of the HARQ control is the HARQ control applicable to the case where the first time interval does not overlap the gap period (the time interval for measurement by the mobile station 100) but the third time interval overlaps the gap period.

In Pattern 4 of the HARQ control, the mobile station 100 is configured not to transmit the uplink shared signal at the first time interval (reference numeral 1104 in FIG. 17, a sub-frame #i+4) and to retransmit the uplink shared signal at the second time interval (reference numeral 1108 in FIG. 17, a sub-frame #i+12) irrespective of whether or not the second downlink control signal is received.

Meanwhile, the base station apparatus 200 is configured not to receive the uplink shared signal at the first time interval (reference numeral 1104 in FIG. 17, the sub-frame #i+4), not to transmit the second downlink control signal at the third time interval (reference numeral 1106 in FIG. 17, a sub-frame #i+8), to receive the uplink shared signal at the second time interval (reference numeral 1108 in FIG. 17, the sub-frame #i+12), and to transmit the second downlink control signal at reference numeral 1110 (a sub-frame #i+16).

Effects of the mobile communication system (Pattern 4) according to the first embodiment of the present invention are as follows.

In Pattern 3, in order to realize flexible allocation of resources at reference numeral 1008 in FIG. 15, the HARQ indicator at reference numeral 1006 is regarded as ACK and the mobile station 100 employs the operation not to perform retransmission of the uplink shared signal until retransmission is instructed by the uplink scheduling grant.

The above-described operation can realize flexible allocation of resources but the timing when the uplink shared signal is actually retransmitted is at reference numeral 1012, which means a significant delay. In other words, there arises a problem that retransmission of the uplink shared signal is delayed.

On the other hand, in Pattern 4, it is possible to reduce the above-described delay as the uplink shared signal is retransmitted at reference numeral 1108.

Here, Pattern 4 employs the method of stopping transmission of the original data signal itself (the uplink shared signal in this case) when it is apparent from the beginning that the transmission acknowledgment information will not be correctly received as similar to Pattern 3. Accordingly, there is also an effect that the safe HARQ control is applied as similar to the case in Pattern 3.

<Pattern 5>

Figure 18:
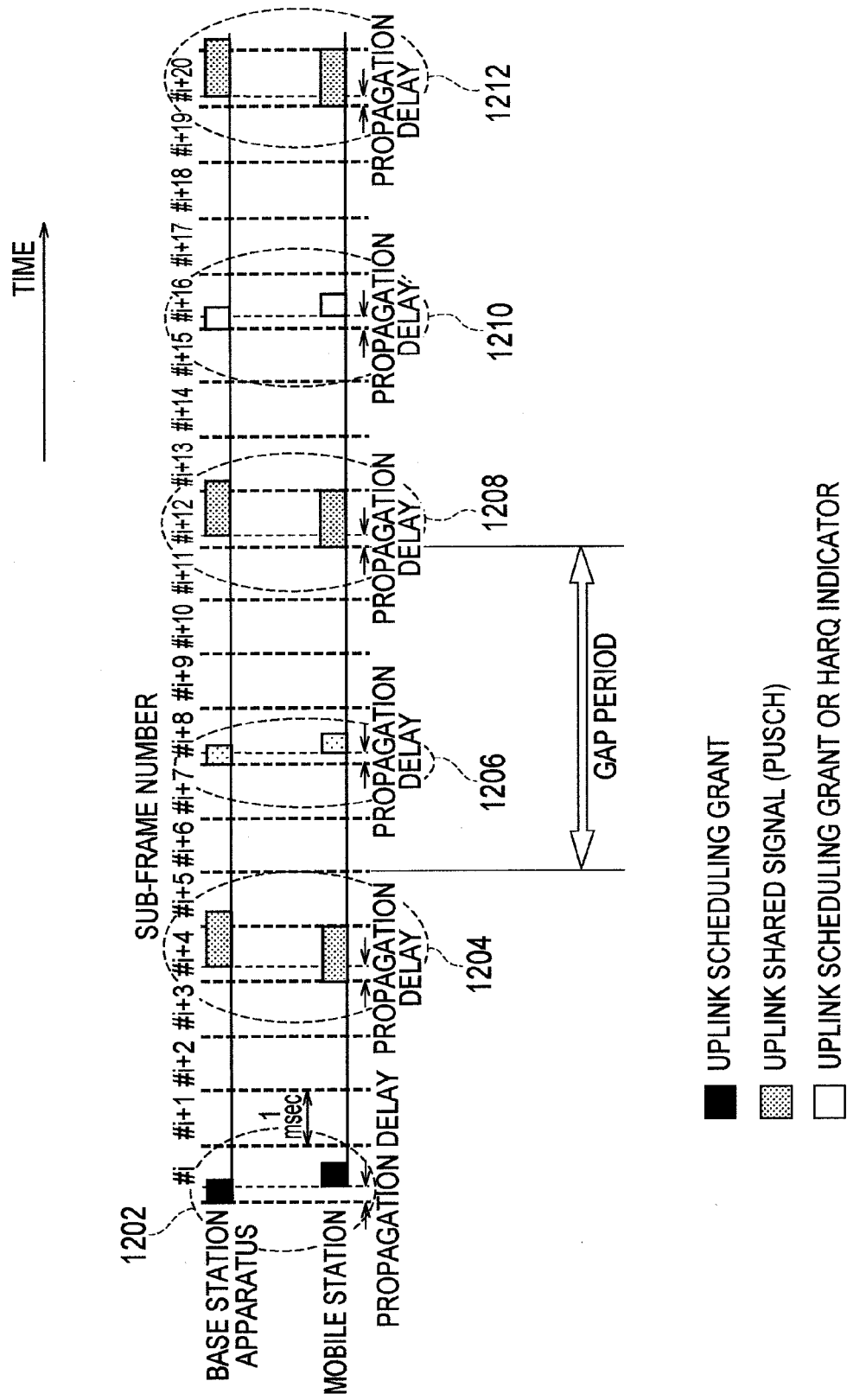
FIG. 18 is a view for explaining an operation (Pattern 5) of the mobile communication system according to the first embodiment of the present invention.

Pattern 5 of the HARQ control will be described with reference to FIG. 18. In the following, Pattern 5 of the HARQ control will be described while focusing on differences from Patterns 1 to 3 of the HARQ control described above.

In Pattern 5 of the HARQ control, the mobile station 100 is configured to transmit the uplink shared signal at the first time interval (reference numeral 1204 in FIG. 18, a sub-frame #i+4) and to retransmit the uplink shared signal at the second time interval (reference numeral 1208 in FIG. 18, a sub-frame #i+12) irrespective of whether or not the second downlink control signal is received.

Meanwhile, the base station apparatus 200 is configured to receive the uplink shared signal at the first time interval (reference numeral 1204 in FIG. 18, the sub-frame #i+4), not to transmit the second downlink control signal at the third time interval (reference numeral 1206 in FIG. 18, a sub-frame #i+8), to receive the uplink shared signal at the second time interval (reference numeral 1208 in FIG. 18, the sub-frame #i+12), and to transmit the second downlink control signal at reference numeral 1210 (a sub-frame #i+16).

An effect of the mobile communication system (Pattern 5) according to the first embodiment of the present invention is as follows.

In Pattern 4, in order to reduce the problem of the delay in retransmission of the uplink shared signal, retransmission of the uplink shared signal is performed at reference numeral 1108 while sacrificing flexible allocation of resources.

However, transmission of the uplink shared signal is stopped at reference numeral 1104 in order to realize the safe HARQ control.

On the other hand, in Pattern 5, transmission of the uplink shared signal is performed at reference numeral 1204. Hence it is possible to resolve the above-described problem of the delay more properly.

<Pattern 6>

Pattern 6 of the HARQ control will be described with reference to FIG. 19. In the following, Pattern 6 of the HARQ control will be described while focusing on differences from Patterns 1 to 3 of the HARQ control described above.

Pattern 6 of the HARQ control is the HARQ control applicable to the case where the first time interval overlaps the gap period (the time interval for measurement by the mobile station 100) and the third time interval also overlaps the gap period.

Hereinbelow, with reference to FIG. 19, description will be given of operations of the base station apparatus 200 and the mobile station 100 in the case where the gap period includes the sub-frame for transmitting the uplink shared signal and also includes the sub-frame for transmitting either the HARQ indicator concerning the uplink shared signal or the uplink scheduling grant instructing retransmission.

At reference numeral 1302 (a sub-frame #i) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1304 (the sub-frame number #i+4) is included in the gap period of the mobile station 100, the mobile station 100 cannot transmit the uplink shared signal to the base station apparatus 200 at reference numeral 1304 (the sub-frame number #i+4).

At reference numeral 1306 (a sub-frame #i+8), the base station apparatus 200 transmits neither the HARQ indicator nor the uplink scheduling grant to the mobile station 100.

This is because the sub-frame #i+8 is included in the gap period of the mobile station 100, and the mobile station 100 cannot receive the HARQ indicator or the uplink scheduling grant, even if the HARQ indicator or the uplink scheduling grant is transmitted.

At reference numeral 1308 (a sub-frame #i+12), the mobile station 100 does not retransmit the uplink shared signal which was supposed to be transmitted at reference numeral 1304.

In this case, the mobile station 100 may be deemed to be notified of ACK by the HARQ indicator at reference numeral 1306. Specifically, at reference numeral 1306, the mobile station 100 performs an operation which is similar to the case of being notified of ACK via the HARQ indicator channel.

Meanwhile, at reference numeral 1308, the base station apparatus 200 also assumes that the uplink shared signal is not retransmitted and hence does not perform decoding processing of the uplink shared signal.

At reference numeral 1310 (a sub-frame #i+16), the base station apparatus 200 transmits the uplink scheduling grant instructing the mobile station 100 to perform retransmission of the uplink shared signal, which was supposed to be transmitted at reference numeral 1304.

At reference numeral 1312, the mobile station 100 retransmits the uplink shared signal, which was supposed to be transmitted at reference numeral 1304, based on the uplink scheduling grant received at reference numeral 1310 (the sub-frame #i+16).

An effect of the mobile communication system (Pattern 6) according to the first embodiment of the present invention is as follows.

If the PRACH signal is transmitted via the retransmitted sub-frame on the uplink, there arises the problem that the above-mentioned PRACH signal conflicts with the retransmitted uplink shared signal.

In this case, the processing is generally carried out in which the uplink scheduling grant is transmitted for transmission of the above-described retransmitted uplink shared signal, and the frequency resource of the retransmitted uplink shared signal is changed so that the retransmitted uplink shared signal does not conflict with the above-described PRACH signal.

Figure 19:
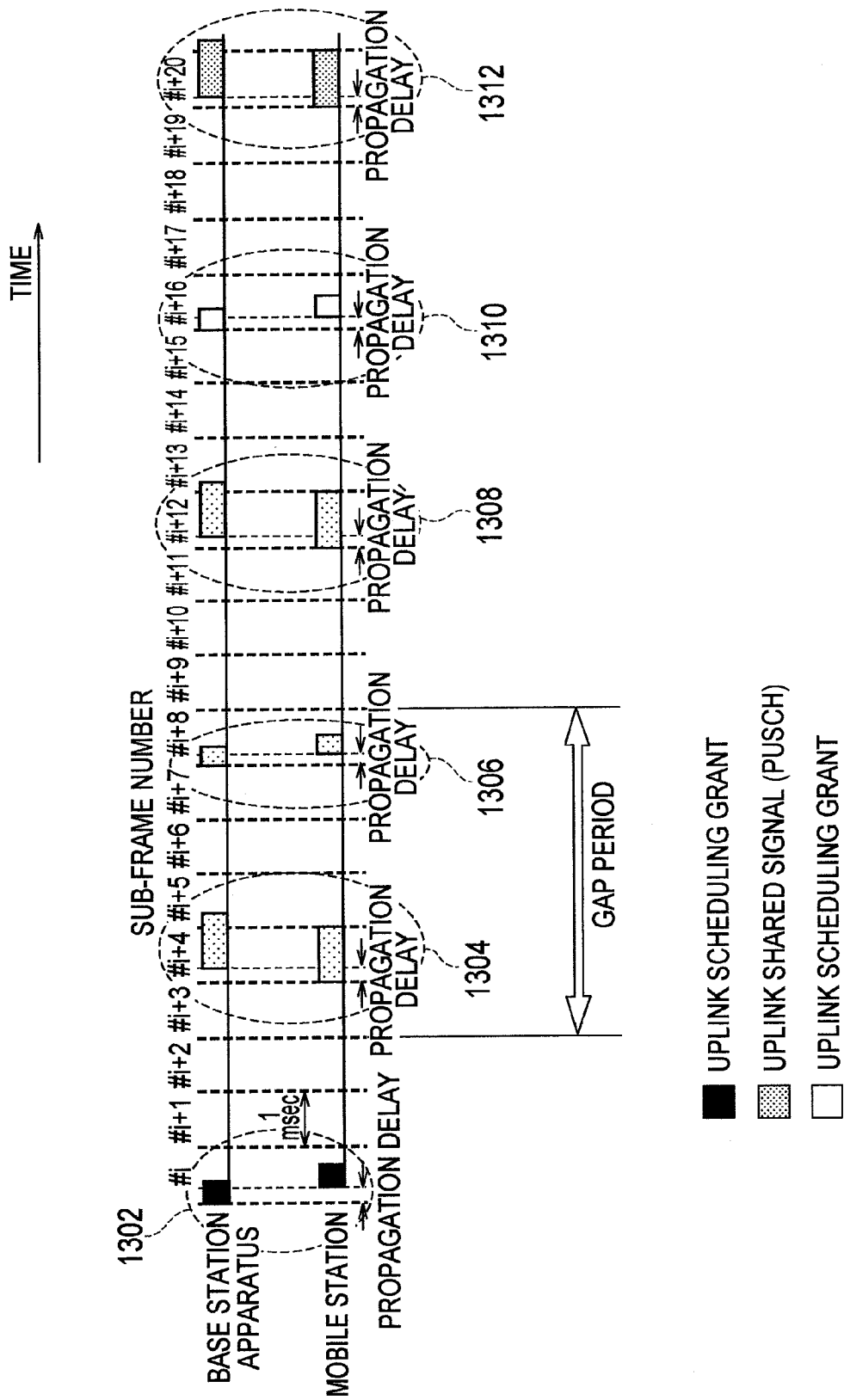
FIG. 19 is a view for explaining an operation (Pattern 6) of the mobile communication system according to the first embodiment of the present invention.

However, in the case shown in FIG. 19, it is not possible to carry out the above-described processing because the sub-frame (reference numeral 1306) where the uplink scheduling grant is transmitted is included in the gap period. That is to say, there may arise the problem that the PRACH signal conflicts with the above-described retransmitted uplink shared signal.

As described previously, it is possible to perform flexible allocation of resources at reference numeral 1308 in FIG. 19, for example, by causing the mobile station 100 not to perform retransmission of the uplink shared signal until retransmission is instructed by the uplink scheduling grant. Here, flexible allocation of resources includes avoidance of the conflict between the PRACH signal and the retransmitted uplink shared signal, for example.

<Pattern 7>

Figure 20:
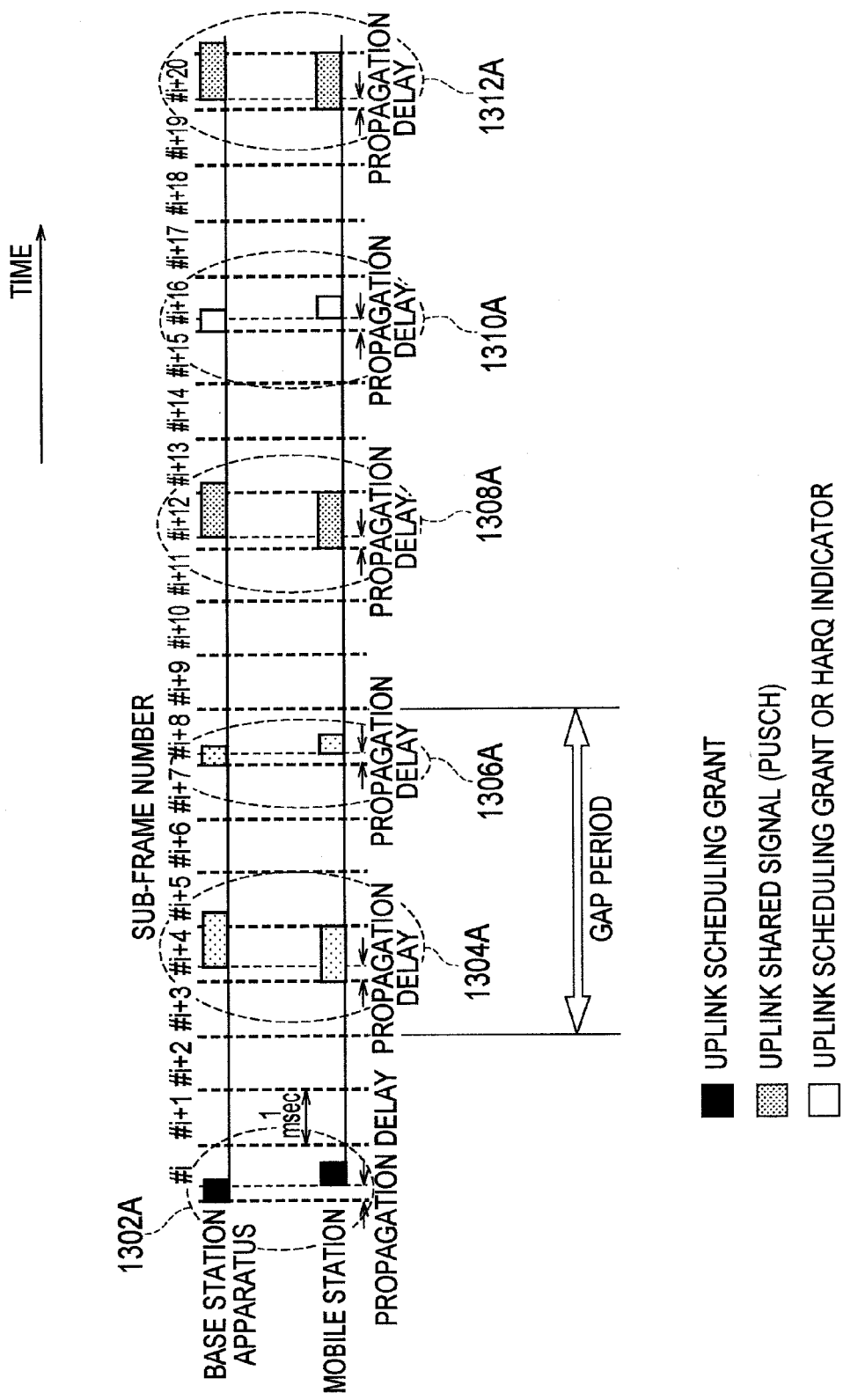
FIG. 20 is a view for explaining an operation (Pattern 7) of the mobile communication system according to the first embodiment of the present invention.

Pattern 7 of the HARQ control will be described with reference to FIG. 20. In the following, Pattern 7 of the HARQ control will be described while focusing on differences from Pattern 6 of the HARQ control described above.

Pattern 7 of the HARQ control is the HARQ control applicable to the case where the first time interval overlaps the gap period (the time interval for measurement by the mobile station 100) and the third time interval also overlaps the gap period.

Hereinbelow, with reference to FIG. 20, description will be given of operations of the base station apparatus 200 and the mobile station 100 in the case where the gap period includes the sub-frame for transmitting the uplink shared signal and also includes the sub-frame for transmitting either the HARQ indicator concerning the uplink shared signal or the uplink scheduling grant instructing retransmission.

At reference numeral 1302A (a sub-frame #1) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1304A (the sub-frame number #i+4) is included in the gap period of the mobile station 100, the mobile station 100 cannot transmit the uplink shared signal to the base station apparatus 200 at reference numeral 1304A (the sub-frame number #i+4).

At reference numeral 1306A (a sub-frame #i+8), the base station apparatus 200 transmits neither the HARQ indicator nor the uplink scheduling grant to the mobile station 100.

This is because the sub-frame #i+8 is included in the gap period of the mobile station 100, and the mobile station 100 cannot receive the HARQ indicator or the uplink scheduling grant, even if the HARQ indicator or the uplink scheduling grant is transmitted.

At reference numeral 1308A (a sub-frame #i+12), the mobile station 100 retransmits the uplink shared signal which was supposed to be transmitted at reference numeral 1304, and the base station apparatus 200 receives and decodes the uplink shared signal.

At reference numeral 1310A (a sub-frame #i+16), the base station apparatus 200 transmits either the HARQ indicator showing a result of the above-described decoding or the uplink scheduling grant instructing transmission of either a new uplink shared signal or the retransmitted uplink shared signal to the mobile station 100.

When the above-described HARQ indicator indicates NACK or when the above-described scheduling grant is the uplink scheduling grant instructing transmission of the retransmitted uplink shared signal, the mobile station 100 performs transmission of the retransmitted uplink shared signal at reference numeral 1312A (a sub-frame #i+16).

When the above-described scheduling grant is the uplink scheduling grant instructing transmission of the new uplink shared signal, the mobile station 100 performs transmission of the newly transmitted uplink shared signal at reference numeral 1312A (the sub-frame #i+16).

When the above-described HARQ indicator indicates ACK, the mobile station 100 does not perform transmission of the retransmitted uplink shared signal at reference numeral 1312A (the sub-frame #i+16).

An effect of the mobile communication system (Pattern 7) according to the first embodiment of the present invention is as follows.

In Pattern 6, in order to realize flexible allocation of resources at reference numeral 1308 in FIG. 19, the HARQ indicator at reference numeral 1306 is regarded as ACK and the mobile station 100 employs the operation not to perform retransmission of the uplink shared signal until retransmission is instructed by the uplink scheduling grant.

The above-described operation can realize flexible allocation of resources but the timing when the uplink shared signal is actually retransmitted at reference numeral 1312, which means a significant delay. In other words, there arises a problem that retransmission of the uplink shared signal is delayed.

On the other hand, in Pattern 7, it is possible to reduce the delay as the uplink shared signal is retransmitted at reference numeral 1308A.

<Pattern 8>

Pattern 8 of the HARQ control will be described with reference to FIG. 21. In the following, Pattern 8 of the HARQ control will be described while focusing on differences from Patterns 1 to 7 of the HARQ control described above.

Pattern 8 of the HARQ control is the HARQ control applicable to the case where the third time interval does not overlap the gap period (the time interval for measurement by the mobile station 100) but the first time interval overlaps the gap period.

Hereinbelow, with reference to FIG. 21, description will be given of operations of the base station apparatus 200 and the mobile station 100 in the case where the gap period does not include the sub-frame for transmitting either the HARQ indicator concerning the uplink shared signal or the uplink scheduling grant instructing retransmission but includes the sub-frame for transmitting the uplink shared signal.

In this pattern, concerning the HARQ indicator relative to the uplink shared signal and the uplink scheduling grant instructing retransmission which are not transmitted due to the gap period, the HARQ indicator is not transmitted whereas the uplink scheduling grant may be transmitted or not.

Figure 21:
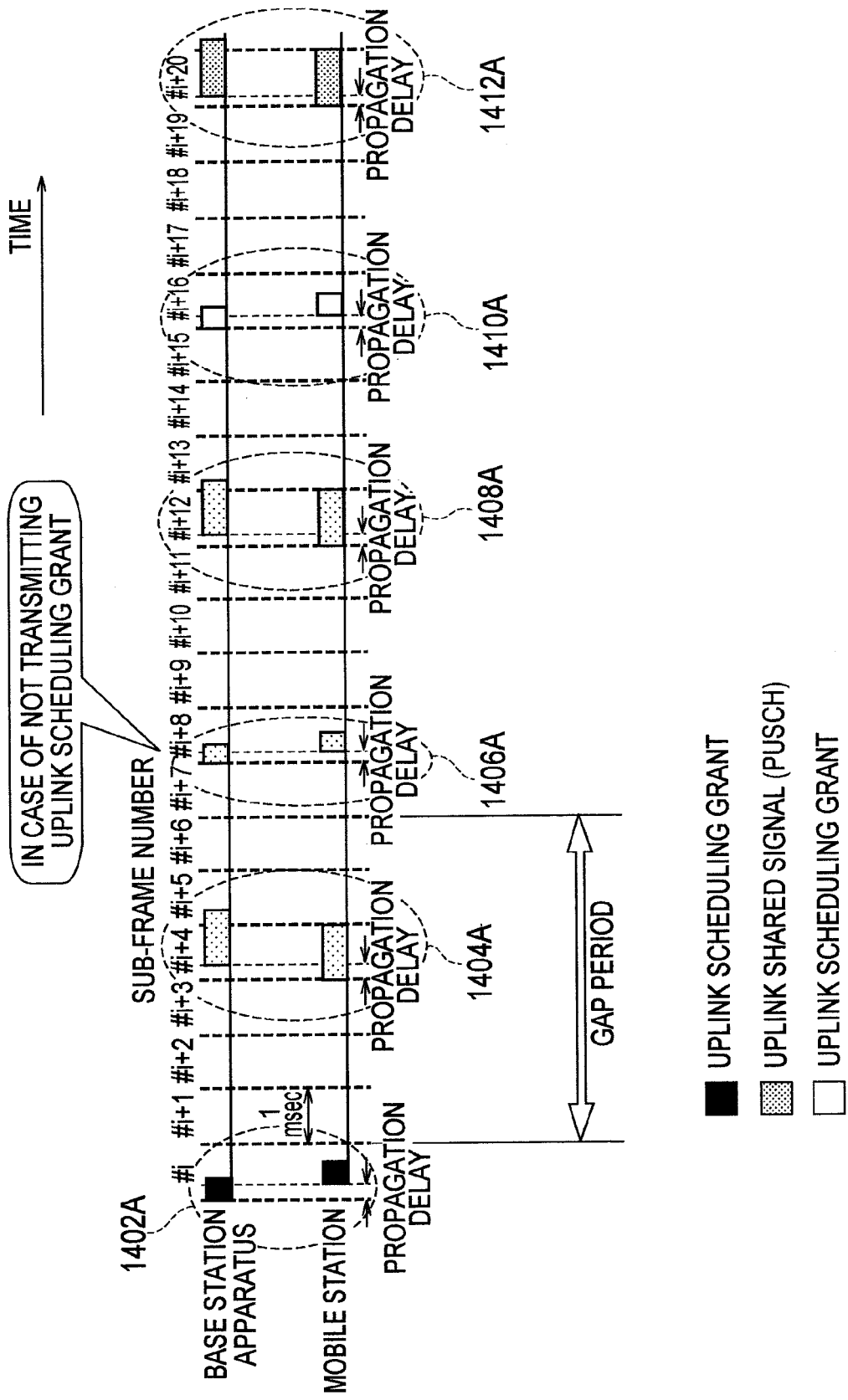
FIG. 21 is a view for explaining an operation (Pattern 8) of the mobile communication system according to the first embodiment of the present invention.
Figure 22:
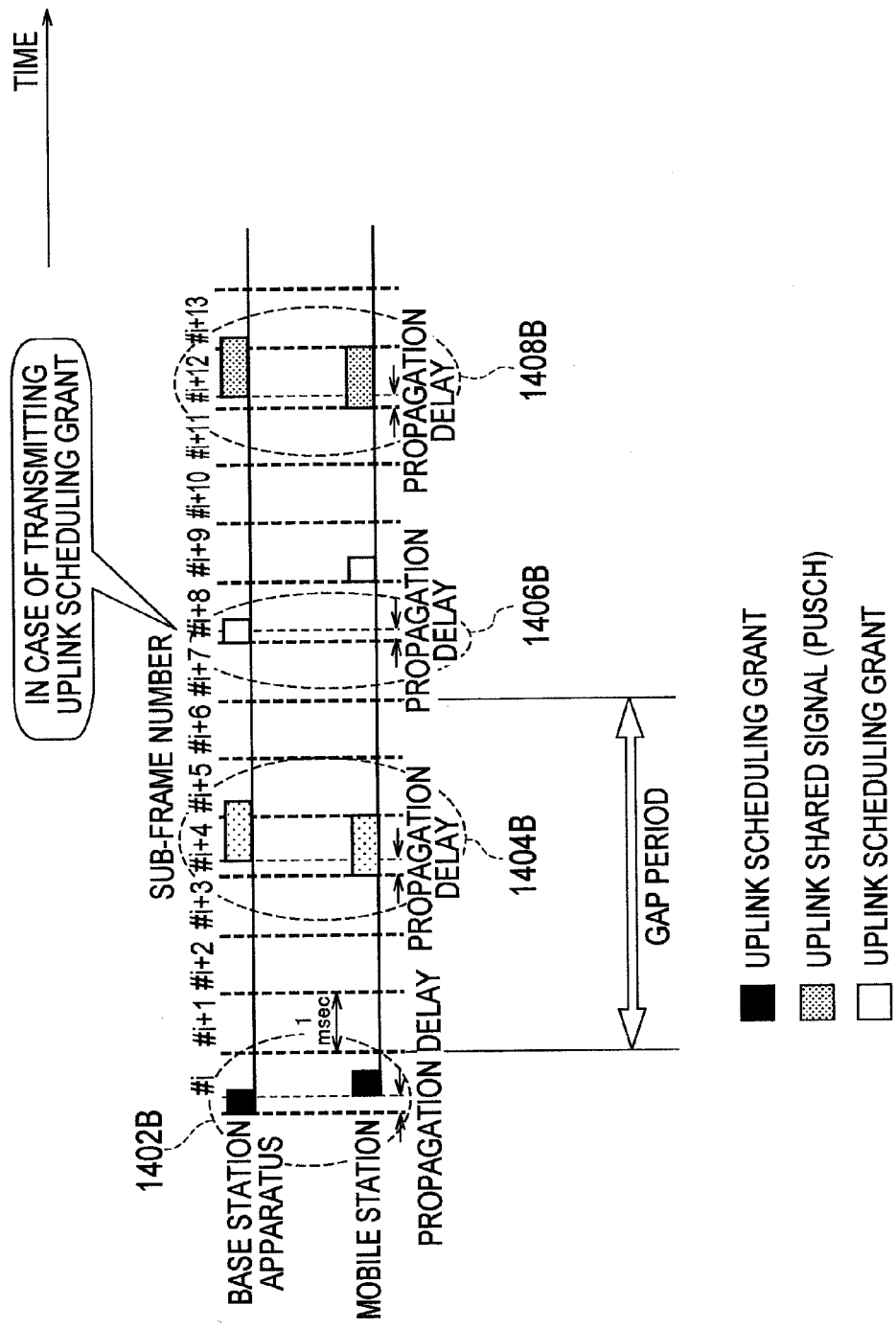
FIG. 22 is a view for explaining an operation (Pattern 9) of the mobile communication system according to the first embodiment of the present invention.

In this case, the base station apparatus 200 does not transmit the HARQ indicator relative to the above-described uplink shared signal which is not transmitted, and the mobile station 100 does not receive the HARQ indicator relative to the above-described uplink shared signal which is not transmitted (reference numeral 1406A in FIG. 21, reference numeral 1406B in FIG. 22).

Meanwhile, the base station apparatus 200 transmits the uplink scheduling grant (reference numeral 1406B in FIG. 22) to the mobile station 100 when the base station apparatus 200 instructs the mobile station 100 to retransmit the above-described uplink shared signal which is not transmitted, or the base station apparatus 200 does not transmit the uplink scheduling grant (reference numeral 1406A in FIG. 21) to the mobile station 100 when the base station apparatus 200 does not instruct the mobile station 100 to retransmit the above-described uplink shared signal which is not transmitted.

Then, the mobile station 100 performs retransmission of the above-described uplink shared signal when receiving the uplink scheduling grant instructing retransmission of the above-described uplink shared signal which is not transmitted (reference numeral 1406B in FIG. 22), or the mobile station 100 presumes that ACK is received as the HARQ indicator when not receiving the uplink scheduling grant instructing retransmission of the above-described uplink shared signal which is not transmitted (reference numeral 1406A in FIG. 21).

In the following, the case of not transmitting the uplink scheduling grant instructing retransmission will be described in Pattern 8 while the case of transmitting the uplink scheduling grant instructing retransmission will be described in Pattern 9.

At reference numeral 1402A (a sub-frame #i) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1404A (the sub-frame number #i+4) is included in the gap period of the mobile station 100, the mobile station 100 cannot transmit the uplink shared signal to the base station apparatus 200 at reference numeral 1404A (the sub-frame number #i+4).

At reference numeral 1406A (a sub-frame #i+8), the base station apparatus 200 transmits neither the HARQ indicator nor the uplink scheduling grant to the mobile station 100.

A conceivable reason why the base station apparatus 200 does not transmit the uplink scheduling grant to the mobile station 100 at reference numeral 1406A is that the PRACH signal is transmitted at reference numeral 1408A and there are no radio resources for retransmission of the uplink shared signal, for example.

At reference numeral 1408A (a sub-frame #i+12), the mobile station 100 does not retransmit the uplink shared signal which was supposed to be transmitted at reference numeral 1404A. This is because the mobile station 100 presumes that ACK is received as the HARQ indicator at reference numeral 1406A based on the fact that uplink scheduling grant is not received at reference numeral 1406A.

At reference numeral 1410A (a sub-frame #i+16), the base station apparatus 200 transmits the uplink scheduling grant instructing retransmission of the uplink shared signal to the mobile station 100.

At reference numeral 1412A, the mobile station 100 retransmits the uplink shared signal, which was supposed to be transmitted at reference numeral 1404A, based on the uplink scheduling grant received at reference numeral 1410A (the sub-frame #i+16).

<Pattern 9>

Pattern 9 of the HARQ control will be described with reference to FIG. 22. In the following, Pattern 9 of the HARQ control will be described while focusing on differences from Pattern 8 of the HARQ control described above.

Pattern 9 of the HARQ control is the HARQ control applicable to the case where the third time interval does not overlap the gap period (the time interval for measurement by the mobile station 100) but the first time interval overlaps the gap period.

Hereinbelow, with reference to FIG. 22, description will be given of operations of the base station apparatus 200 and the mobile station 100 in the case where the gap period does not include the sub-frame for transmitting either the HARQ indicator concerning the uplink shared signal or the uplink scheduling grant instructing retransmission, but includes the sub-frame for transmitting the uplink shared signal.

At reference numeral 1402B (a sub-frame #i) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1404B (the sub-frame number #i+4) is included in the gap period of the mobile station 100, the mobile station 100 cannot transmit the uplink shared signal to the base station apparatus 200 at reference numeral 1404B (the sub-frame number #i+4).

At reference numeral 1406B (a sub-frame #i+8), the base station apparatus 200 transmits the uplink scheduling grant instructing retransmission of the above-described uplink shared signal to the mobile station 100.

At reference numeral 1408B (a sub-frame #i+12), the mobile station 100 retransmits the uplink shared signal, which was supposed to be transmitted at reference numeral 1404B, based on the uplink scheduling grant received at reference numeral 1406B (the sub-frame #i+8).

As shown in Patterns 8 and 9 described above, the mobile station 100 presumes that ACK is received as the HARQ indicator when the base station apparatus 200 does not transmit the uplink scheduling grant for retransmission, i.e., when the mobile station 100 does not receive the uplink scheduling grant for retransmission. Accordingly, it is possible to achieve flexible allocation of radio resources at a subsequent transmission timing (reference numeral 1408A in FIG. 21, reference numeral 1408B in FIG. 22) of the uplink shared signal.

Here, flexible allocation of radio resources means processing to stop retransmission of the above-described uplink shared signal when radio resources for retransmitting the uplink shared signal conflict with radio resources for the PRACH, for example.

<Pattern 10>

Pattern 10 of the HARQ control will be described with reference to FIG. 23. In the following, Pattern 10 of the HARQ control will be described while focusing on differences from Patterns 1 to 9 of the HARQ control described above.

Pattern 10 of the HARQ control is the HARQ control applicable to the case where the third time interval does not overlap the gap period (the time interval for measurement by the mobile station 100) but the first time interval overlaps the gap period.

Hereinbelow, with reference to FIG. 23, description will be given of operations of the base station apparatus 200 and the mobile station 100 in the case where the gap period does not include the sub-frame for transmitting either the HARQ indicator concerning the uplink shared signal or the uplink scheduling grant instructing retransmission, but includes the sub-frame for transmitting the uplink shared signal.

In this pattern, concerning the HARQ indicator and the uplink scheduling grant instructing retransmission relative to the uplink shared signal which are not transmitted due to the gap period, the HARQ indicator is transmitted whereas the uplink scheduling grant may be transmitted or not.

In this case, the base station apparatus 200 transmits the uplink scheduling grant or the HARQ indicator to the mobile station 100 (reference numeral 1406D in FIG. 24) when instructing the mobile station 100 to retransmit the above-described uplink shared signal which is not transmitted to the mobile station 100, and the base station apparatus 200 transmits the HARQ indicator to notify ACK but does not transmit the uplink scheduling grant to the mobile station 100 (reference numeral 1406C in FIG. 23) when not instructing the mobile station 100 to retransmit the above-described uplink shared signal which is not transmitted to the mobile station 100.

Figure 23:
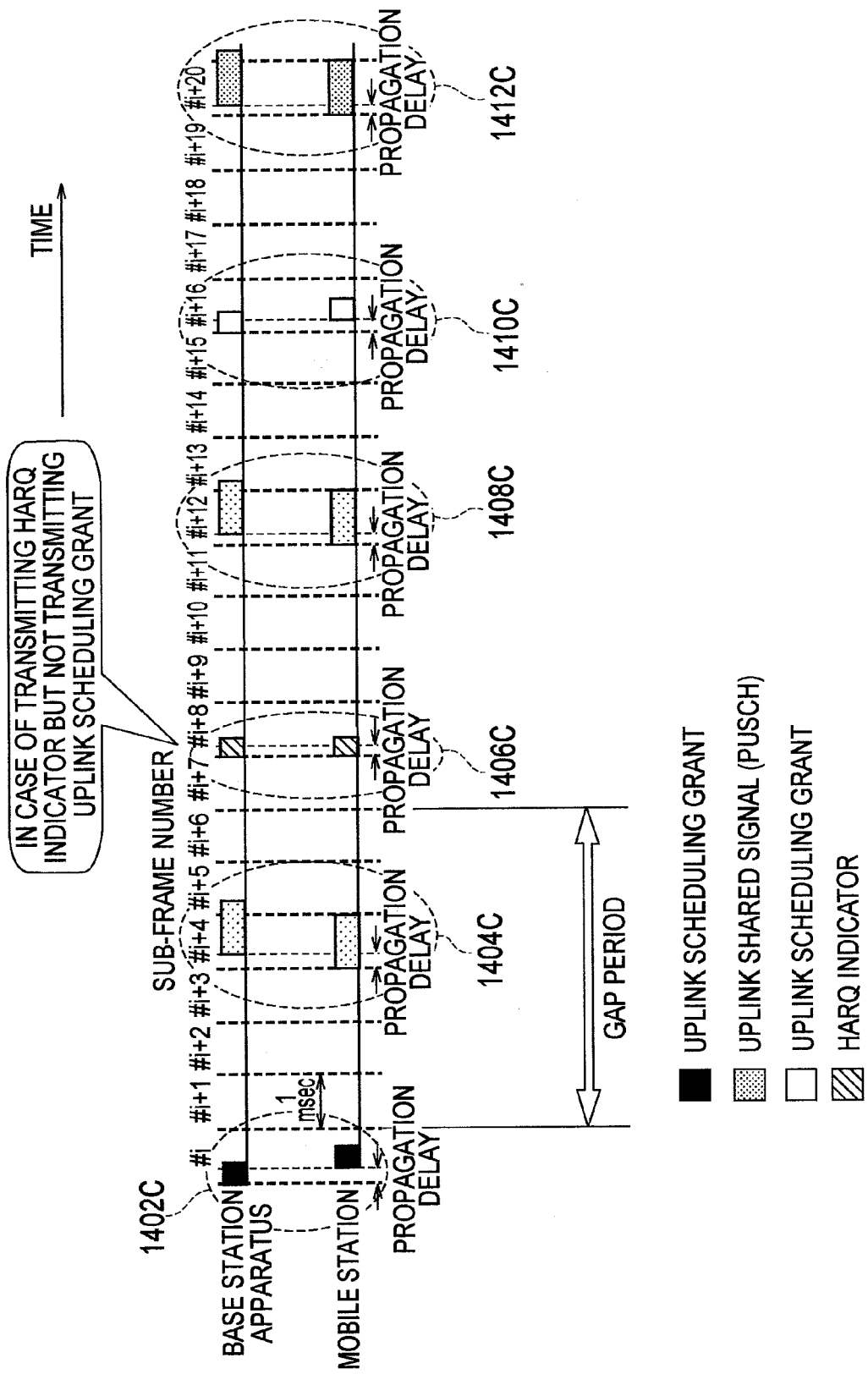
FIG. 23 is a view for explaining an operation (Pattern 10) of the mobile communication system according to the first embodiment of the present invention.

Then, the mobile station 100 performs retransmission of the above-described uplink shared signal when receiving the uplink scheduling grant or the HARQ indicator instructing retransmission of the above-described uplink shared signal which is not transmitted (reference numeral 1406D in FIG. 24), or the mobile station 100 presumes that the HARQ indicator indicating ACK is received when not receiving the uplink scheduling grant instructing retransmission of the above-described uplink shared signal which is not transmitted but receiving the HARQ indicator indicating ACK (reference numeral 1406C in FIG. 23).

In the following, the case of not transmitting the uplink scheduling grant instructing retransmission and transmitting the HARQ indicator indicating ACK will be described in Pattern 10, while the case of transmitting the uplink scheduling grant or the HARQ indicator instructing retransmission will be described in Pattern 11.

At reference numeral 1402C (a sub-frame #i) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1404C (the sub-frame number #i+4) is included in the gap period of the mobile station 100, the mobile station 100 cannot transmit the uplink shared signal to the base station apparatus 200 at reference numeral 1404C (the sub-frame number #i+4).

At reference numeral 1406C (a sub-frame #i+8), the base station apparatus 200 transmits the HARQ indicator indicating ACK but does not transmit the uplink scheduling grant to the mobile station 100.

A conceivable reason why the base station apparatus 200 transmits ACK to the mobile station 100 but does not transmit the uplink scheduling grant at reference numeral 1406C is that the PRACH signal is transmitted at reference numeral 1408C and there are no radio resources for retransmission of the uplink shared signal, for example.

At reference numeral 1408C (a sub-frame #i+12), the mobile station 100 does not retransmit the uplink shared signal which was supposed to be transmitted at reference numeral 1404C. This is based on the fact that the HARQ indicator indicating ACK is received but the uplink scheduling grant is not received at reference numeral 1406C.

At reference numeral 1410C (a sub-frame #i+16), the base station apparatus 200 transmits the uplink scheduling grant instructing retransmission of the uplink shared signal to the mobile station 100.

At reference numeral 1412C, the mobile station 100 retransmits the uplink shared signal, which was supposed to be transmitted at reference numeral 1404C, based on the uplink scheduling grant received at reference numeral 1410C (the sub-frame #i+16).

In the above-described example, the base station apparatus 200 is configured to perform the operations to transmit the HARQ indicator indicating ACK to the mobile station 100 but not to transmit the uplink scheduling grant at reference numeral 1406C. Instead, the base station apparatus 200 may be configured to perform operations to transmit the HARQ indicator indicating ACK to the mobile station 100 and to transmit the uplink scheduling grant instructing new transmission. In this case, the uplink shared signal which was supposed to be transmitted at reference numeral 1404C is not transmitted but discarded by the mobile station 100.

<Pattern 11>

Pattern 11 of the HARQ control will be described with reference to FIG. 24. In the following, Pattern 11 of the HARQ control will be described while focusing on differences from Pattern 10 of the HARQ control described above.

Pattern 11 of the HARQ control is the HARQ control applicable to the case where the third time interval does not overlap the gap period (the time interval for measurement by the mobile station 100) but the first time interval overlaps the gap period.

Hereinbelow, with reference to FIG. 24, description will be given of operations of the base station apparatus 200 and the mobile station 100 in the case where the gap period does not include the sub-frame for transmitting either the HARQ indicator concerning the uplink shared signal or the uplink scheduling grant instructing retransmission, but includes the sub-frame for transmitting the uplink shared signal.

At reference numeral 1402D (a sub-frame #i) (where i is an integer satisfying i>0), the base station apparatus 200 uses the uplink scheduling grant on the physical downlink control channel and instructs the mobile station 100 to perform communication using the uplink shared channel at a sub-frame #i+4.

Since reference numeral 1404D (the sub-frame number #i+4) is included in the gap period of the mobile station 100, the mobile station 100 cannot transmit the uplink shared signal to the base station apparatus 200 at reference numeral 1404D (the sub-frame number #i+4).

At reference numeral 1406D (a sub-frame #i+8), the base station apparatus 200 transmits the uplink scheduling grant or the HARQ indicator instructing retransmission of the above-described uplink shared signal to the mobile station 100. Here, the HARQ indicator may represent any of ACK and NACK.

To be more precise, the base station apparatus 200 may transmit the uplink scheduling grant instructing retransmission of the above-described uplink shared signal and the HARQ indicator indicating ACK to the mobile station 100.

Alternatively, the base station apparatus 200 may transmit the HARQ indicator indicating NACK to the mobile station without transmitting the uplink scheduling grant instructing retransmission of the above-described uplink shared signal.

At reference numeral 1408D (a sub-frame #i+12), the mobile station 100 retransmits the uplink shared signal, which was supposed to be transmitted at reference numeral 1404D, based on the uplink scheduling grant or the HARQ indicator received at reference numeral 1406D (the sub-frame #i+8).

Here, the HARQ control shown in Patterns 10 and 11 described above becomes the same as the control when the sub-frame #i+4 is not included in the gap period of the mobile station 100, namely, the normal HARQ control.

In other words, the HARQ control shown in Patterns 10 and 11 described above may be applicable irrespective of whether or not the sub-frame #i+4 is included in the gap period of the mobile station 100.

As shown in Patterns 10 and 11 described above, by transmitting the HARQ indicator and the uplink scheduling grant relative to the uplink shared signal which was not transmitted due to the gap period, it is possible to achieve flexible allocation of radio resources at a subsequent transmission timing (reference numeral 1408C in FIG. 23, reference numeral 1408D in FIG. 24) of the uplink shared signal.

Here, flexible allocation of radio resources means the processing to stop retransmission of the above-described uplink shared signal when the radio resources for retransmitting the uplink shared signal conflict with the radio resources for the PRACH, for example.

To sum up Patterns 1, 2, and 6 of the HARQ control among the above-described patterns, when the third time interval, i.e., the time frame (the sub-frame) for transmitting either the HARQ indicator relative to the uplink shared signal or the uplink scheduling grant relative to the uplink shared signal is included in the gap period (the time interval for measurement by the mobile station 100), the mobile station 100 presumes that the uplink shared signal is correctly decoded and therefore does not perform retransmission of the uplink shared signal.

Specifically, the mobile station 100 presumes that the HARQ indicator channel included in the gap period has indicated ACK. In this case, the uplink shared signal will not be retransmitted until retransmission is instructed by the uplink scheduling grant.

Meanwhile, to sum up the above-described HARQ control shown in FIG. 12, FIG. 14, FIG. 16, FIG. 19, FIG. 21, and FIG. 22, when the time frame (the sub-frame) for transmitting the uplink shared signal is included in the gap period (the time interval for measurement by the mobile station 100), the mobile station 100 presumes that the uplink shared signal is correctly decoded and therefore does not perform retransmission of the uplink shared signal.

Specifically, the mobile station 100 presumes that the HARQ indicator channel relative to the uplink shared signal has indicated ACK. In this case, the uplink shared signal will not be retransmitted until retransmission is instructed by the uplink scheduling grant.

Meanwhile, to further sum up the above-described operations, the mobile station 100 may perform operations: to presume that the uplink shared signal is correctly decoded and not to perform retransmission of the uplink shared signal when the time frame (the sub-frame) for transmitting either the HARQ indicator relative to the uplink shared signal or the uplink scheduling grant relative to the uplink shared signal is included in the gap period (the time interval for measurement by the mobile station 100); and to presume that the uplink shared signal is correctly decoded and not to perform retransmission of the uplink shared signal when the time frame (the sub-frame) for transmitting the uplink shared signal is included in the gap period (the time interval for measurement by the mobile station 100).

Specifically, the mobile station 100 presumes that the HARQ indicator relative to the uplink shared signal has indicated ACK. In this case, the uplink shared signal will not be retransmitted until retransmission is instructed by the uplink scheduling grant.

Figure 24:
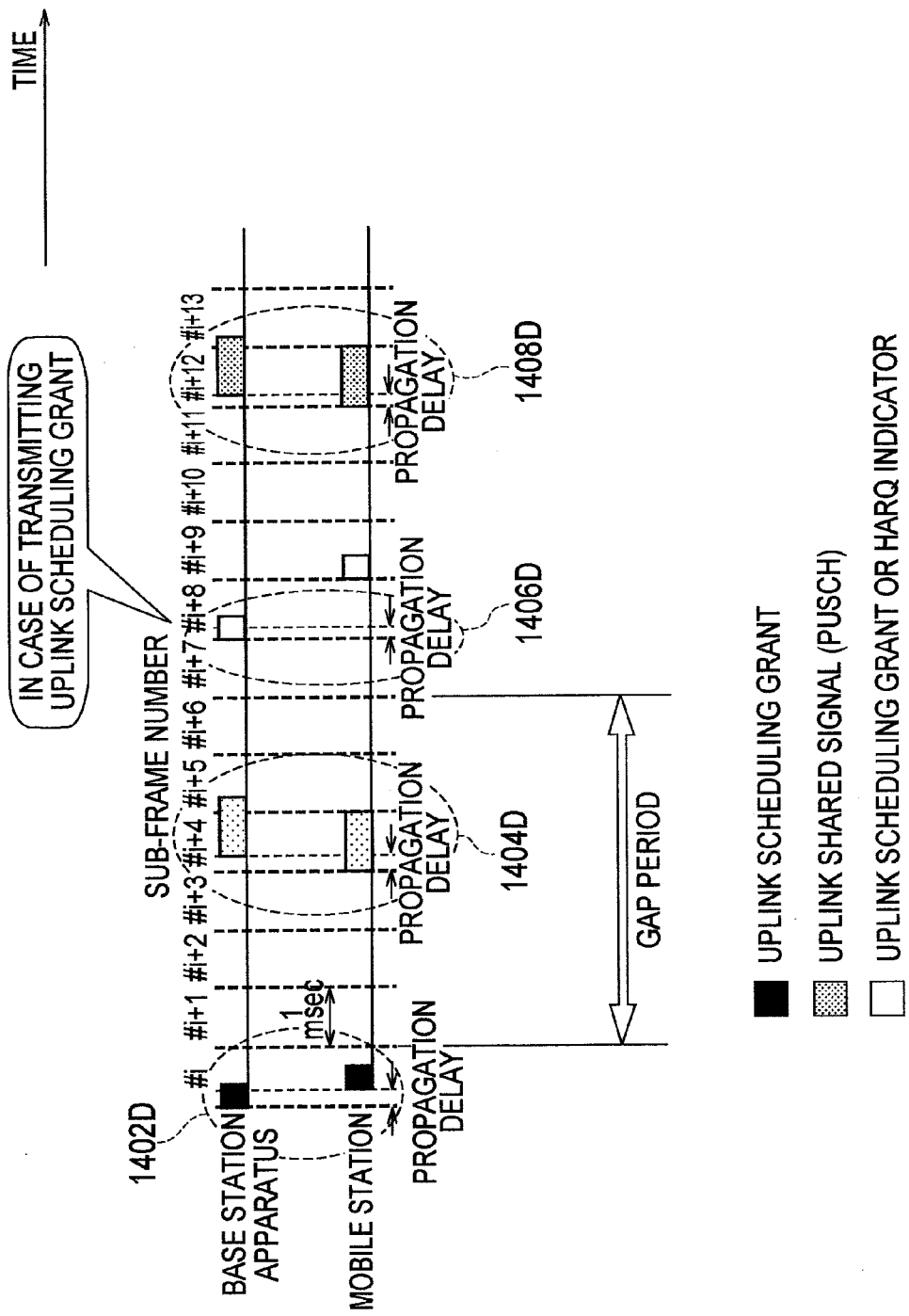
FIG. 24 is a view for explaining an operation (Pattern 11) of the mobile communication system according to the first embodiment of the present invention.

Alternatively, to sum up Patterns 1, 2, and 6 of the HARQ control and the HARQ control shown in FIG. 23 and FIG. 24, the mobile station 100 may perform operations: to presume that the uplink shared signal is correctly decoded and not to perform retransmission of the uplink shared signal when the time frame (the sub-frame) for transmitting either the HARQ indicator relative to the uplink shared signal or the uplink scheduling grant relative to the uplink shared signal is included in the gap period (the time interval for measurement by the mobile station 100); and to execute the HARQ control as per normal irrespective of whether or not the time frame (the sub-frame) for transmitting the uplink shared signal is included in the gap period (the time interval for measurement by the mobile station 100) if the time frame (the sub-frame) for transmitting either the HARQ indicator relative to the uplink shared signal or the uplink scheduling grant relative to the uplink shared signal is not included in the gap period (the time interval for measurement by the mobile station 100).

Note that operation of the above described mobile station 100 and of the radio base station 200 may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station 100 and the radio base station 200. Also, the storage medium and the processor may be provided in the mobile station 100 and the radio base station 200 as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

It is to be noted that the entire contents of Japanese Patent Application No. 2008-074742 (filed on Mar. 21, 2008) is incorporated into the description of the present application.

INDUSTRIAL APPLICABILITY

As described above, according to the present invention, it is possible to provide a mobile station and a base station apparatus which are capable of realizing efficient and robust HARQ control concerning a HARQ control method on an uplink in the case where a gap period is present.

The invention claimed is:

1. A base station apparatus configured to receive an uplink shared signal from a mobile station, comprising:
   a first transmitter unit configured to transmit a first downlink control signal to the mobile station, the first downlink control signal instructing a first time interval for transmitting an uplink shared signal;
   a first receiver unit configured to receive the uplink shared signal transmitted by the mobile station at the first time interval based on the first downlink control signal;
   a second transmitter unit configured to transmit a second downlink control signal at a third time interval allocated fixedly based on a reception result at the first receiver unit; and
   a second receiver unit configured to receive the uplink shared signal at a second time interval, the uplink shared signal being retransmitted by the mobile station based on the second downlink control signal; wherein
   when the third time interval overlaps a time interval for measurement by the mobile station, the first receiver unit is configured to receive the uplink shared signal at the first time interval, the second transmitter unit is configured not to transmit the second downlink control signal at the third time interval, and the second receiver unit is configured not to receive the uplink shared signal at the second time interval; and
   the second transmitter unit is configured not to transmit the second downlink control signal at a time interval not overlapping the time interval for measurement by the mobile station, after the time interval for measurement by the mobile station elapses.

2. A base station apparatus configured to receive an uplink shared signal from a mobile station, comprising:
- a first transmitter unit configured to transmit a first downlink control signal to the mobile station, the first downlink control signal instructing a first time interval for transmitting an uplink shared signal;
- a first receiver unit configured to receive the uplink shared signal transmitted by the mobile station based on the first downlink control signal at the first time interval;
- a second transmitter unit configured to transmit a second downlink control signal at a third time interval allocated fixedly based on a reception result at the first receiver unit; and
- a second receiver unit configured to receive the uplink shared signal at a second time interval, the uplink shared signal being retransmitted by the mobile station based on the second downlink control signal; wherein
- when the third time interval overlaps a time interval for measurement by the mobile station, the second transmitter unit is configured to presume that an acknowledgement response is transmitted as information on the second downlink control signal; and
- the second transmitter unit is configured not to transmit the second downlink control signal at a time interval not overlapping the time interval for measurement by the mobile station, after the time interval for measurement by the mobile station elapses.

* * * * *